US008421892B2

(12) United States Patent
Endo et al.

(10) Patent No.: US 8,421,892 B2
(45) Date of Patent: Apr. 16, 2013

(54) SOLID-STATE IMAGING DEVICE AND IMAGING APPARATUS

(75) Inventors: Yasuyuki Endo, Hyogo (JP); Hiroshi Toya, Nara (JP)

(73) Assignee: Panasonic Corporation, Osaka (JP)

( * ) Notice: Subject to any disclaimer, the term of this patent is extended or adjusted under 35 U.S.C. 154(b) by 153 days.

(21) Appl. No.: 13/069,631

(22) Filed: Mar. 23, 2011

(65) Prior Publication Data

US 2011/0169992 A1    Jul. 14, 2011

Related U.S. Application Data

(63) Continuation of application No. PCT/JP2009/004748, filed on Sep. 18, 2009.

(30) Foreign Application Priority Data

Sep. 25, 2008    (JP) .................................. 2008-246858

(51) Int. Cl.
 *H04N 5/335*    (2011.01)
(52) U.S. Cl.
 USPC .......................................... 348/308; 348/241
(58) Field of Classification Search .................. 348/247, 348/294, 308, 241
 See application file for complete search history.

(56) References Cited

U.S. PATENT DOCUMENTS

| 7,345,269 | B2 * | 3/2008 | Lee et al. .................... 250/208.1 |
| 7,462,834 | B2 * | 12/2008 | Masazumi ................ 250/370.09 |
| 2004/0228452 | A1 * | 11/2004 | Rinaldi et al. ................. 378/207 |
| 2007/0109432 | A1 * | 5/2007 | Yamaguchi et al. .......... 348/294 |
| 2008/0018764 | A1 * | 1/2008 | Mizoguchi .................... 348/308 |
| 2008/0018771 | A1 | 1/2008 | Hagiwara et al. |
| 2008/0088726 | A1 * | 4/2008 | Tsukimura .................... 348/308 |
| 2008/0129851 | A1 * | 6/2008 | Kasuga et al. ................. 348/294 |
| 2008/0284887 | A1 | 11/2008 | Toya et al. |

FOREIGN PATENT DOCUMENTS

| JP | 2001-045375 | 2/2001 |
| JP | 2001-045378 | 2/2001 |
| JP | 2001-145026 | 5/2001 |
| JP | 2006-93816 | 4/2006 |
| JP | 2008-288689 | 11/2008 |

OTHER PUBLICATIONS

International Search Report and Written Opinion for PCT/JP2009/004748, dated Nov. 17, 2009 along with an english translation of ISR.

* cited by examiner

*Primary Examiner* — Tuan Ho
*Assistant Examiner* — Zhenzhen Wu
(74) *Attorney, Agent, or Firm* — McDermott Will & Emery LLP

(57) ABSTRACT

A solid-state imaging device includes: an image area including pixels arranged in a matrix; two row memories each of which alternatively (i) stores at a time pixel signals for each of rows, and (ii) sequentially provides each of the stored pixel signals; a reading control unit, during a horizontal period, sequentially reading the stored pixel signals one by one from a first line memory to cause the first line memory, the first line memory representing one of the two row memories; a holding control unit causing, during the horizontal period, a second line memory to hold pixel signals provided from one of the rows in the image area, the second line memory representing another one of the two row memories; and a reading suspending unit causing the reading control unit to suspend reading out the pixel signals from the first line memory during a noise occurrence predicted period.

10 Claims, 27 Drawing Sheets

US 8,421,892 B2

SOLID-STATE IMAGING DEVICE AND IMAGING APPARATUS

CROSS REFERENCE TO RELATED APPLICATION

This is a continuation application of PCT application No. PCT/JP2009/004748 filed on Sep. 18, 2009, designating the United States of America.

BACKGROUND OF THE INVENTION (1) Field of the Invention

The present invention relates to solid-state imaging devices used for digital cameras and, in particular, to a technique employed for a Metal-Oxide-Semiconductor (MOS) solid-state imaging device in order to achieve high-speed reading and image noise reduction.

(2) Description of the Related Art

A typical MOS solid-state imaging device operates as follows; causing a line memory to hold pixel signals in parallel for each row in a horizontal blanking interval, sequentially reading the pixel signals from the line memory in a horizontal readout period following the horizontal blanking interval, and providing the read pixel signals outside. In order to read the pixel signals for a single frame, the MOS solid-state imaging device needs to repeat the above sequence for each of the rows included in the frame.

MOS solid-state imaging devices are finding wider applications today in various fields. One of such promising fields is an ultra high-speed camera which obtains an image at a frame rate significantly higher than that of an ordinary video camera. In order to increase the frame rate, a time period for reading the pixel signals needs to be decreased. Thus Patent Reference 1 (Japanese Unexamined Patent Application Publication No. 2006-93816 (FIG. 1)) proposes a solid-state imaging device which includes first and second row memories. During the horizontal readout period, the solid-state imaging device (i) reads pixel signals found in a first row, and (ii) causes the second line memory to hold pixel signals found in the second row. The above features allow the solid-state imaging device to cause the second line memory to start reading the pixel signals found in the second row as soon as the pixel signals found in the first row are read. This operation contributes to a shorter reading period of the pixel signals, decreasing the period by the horizontal blanking interval.

SUMMARY OF THE INVENTION

The above conventional solid-state imaging device causes one of the row memories to hold pixel signals found in a row included in an image area while causing the other line memory to sequentially read pixel signals during the horizontal readout period. Due to the storing of the pixel signals, noise occurs in the pixel signals found in the first row. Since such noise occurs with predetermined timing for each horizontal readout period, the noise clearly appears in the image screen as image fixed pattern vertical line noise or a vertical strip.

The drawing (a) in FIG. 27 is an explanatory drawing of the image noise. FIG. 27 (a) illustrates processes executed on pixel signals found in each of an (N−1)th row, an Nth row, and an (N+1)th row. One of the processes (a parallel processing period) involves storing the pixel signals found in the image area in the line memory, and the other process (a reading period) involves sequentially providing the pixel signals from the line memory. Parallel processing pulses indicate timing to cause the line memory to hold pixel signals, which are found in the image area, for a single row. The two parallel processing pulses in the parallel processing period correspond to a reset level and a pixel signal level. With the timing of the parallel processing pulses, all the pixel signals for the single row are transferred at once from the image area to one of the row memories. This varies the ground potential and the power potential, and develops periodic noise.

FIG. 1 shows a solid-state imaging device including pixels each having three transistors. In the solid-state imaging device, a lower potential needs to be set for an FD, so that the FD and a column signal line are electrically disconnected after the line memory holds the pixel signals for the single row. The periodic noise occurs when the lower potential needs to be set for an FD.

The effect of the periodic noise varies the pixel signals read from the row memories in the timed relationships with the parallel processing pulses. As a result of the variation in the pixel signals, the image noise appears as in a vertical line or a vertical strip as shown in FIG. 27 (b).

The present invention is conceived in view of the above problems and has an object to introduce a solid-state imaging device and an imaging apparatus which includes two row memories and reduces image noise appearing on the image.

In order to solve the above problems, a solid-state imaging device according to an aspect of the present invention includes: an image area including pixels arranged in a matrix; two row memories each of which alternatively (i) stores at a time pixel signals provided from the image area for each of rows, and (ii) sequentially provides each of the stored pixel signals; a reading control unit which, during a horizontal readout period, sequentially reads the stored pixel signals one by one from a first line memory to cause the first line memory, the first line memory representing one of the two row memories; a holding control unit which causes, during the horizontal readout period, a second line memory to hold pixel signals provided from one of the rows in the image area, the second line memory representing another one of the two row memories; and a reading suspending unit which causes the reading control unit to suspend reading out the pixel signals from the first line memory during a noise occurrence predicted period which (i) is included in the horizontal readout period, and (ii) sees occurrence of noise predicted due to an operation of the holding control unit.

The above structure makes possible suspending the reading of the pixel signals by the reading control unit during the noise occurrence predicted period. This contributes to prevention of pixel noise due to variations in the ground potential and the power potential, which reduces image noise.

The reading control unit may cause the first line memory to provide, to the horizontal common signal readout line, each of the pixel signals read from the first line memory, the solid-state imaging device may further include a replacing unit which replaces (i) an electric potential of the horizontal common signal readout line immediately before the noise occurrence predicted period ends with (ii) an electric potential of the stored pixel signal provided immediately before the noise occurrence predicted period starts.

According to the above structure, the electric potential of the horizontal common signal readout line is replaced, so that the behavior of the horizontal common signal readout line can be the same as that, of the horizontal common signal readout line, in which the pixel signals are read without postponement in reading the pixel signals immediately after the noise occurrence predicted period. The above operation reduces an effect due to tiny level variations of the horizontal common signal readout line during the noise occurrence predicted period, which contributes to prevention of the fixed pattern vertical line noise.

The reading control unit may include a shift register which (i) can substantially suspend shifting while receiving a clock pulse, and (ii) provides, to the first line memory, a column selecting signal corresponding a reading position of the pixel signals stored in the first line memory, and the reading suspending unit may cause, during the noise occurrence predicted period, the shift register to substantially suspend the shifting while the shift register is receiving the clock pulse, so that the shift register postpones the reading of one and succeeding pixel signals out of the pixel signals during the noise occurrence predicted period.

According to the structure, the shift register substantially suspends shifting while receiving a clock pulse. Thus, compared with the case where a supply of clock pulses are stopped and resumed, this structure can prevent variations in power supply and voltage due to a sudden load change in resuming the supply of the clock pulses, which contributes to eliminating noise developed immediately after the resumption.

The shift register (i) can switch shifting between a forward direction and a backward direction, and (ii) may provide, to the first line memory, the column selecting signal corresponding to the reading position of the pixel signals stored in the first line memory, and the reading suspending unit may cause the shift register to shift in the backward direction during a first half of the noise occurrence predicted period and in the forward direction during a last half of the noise occurrence predicted period, so that the shift register postpones the reading of one and succeeding pixel signals out of the pixel signals during the noise occurrence predicted period.

According to this structure, the following can be easily achieved: The shift register which can switch shift directions substantially suspends shifting while receiving a clock pulse during the noise occurrence predicted period.

The shift register (i) may include unit registers of stages, and (ii) can selectively provide an output signal of each of the unit registers to either the each unit register or the unit register positioned in a subsequent stage of the each unit register, the stage being included in the stages, and the reading suspending unit may cause each unit register to provide the output signal to the unit register during the noise occurrence predicted period.

According to this structure, the following can be easily achieved: The reading postponing unit causes each unit register to provide the output signal of each of the unit resisters to the each unit register during the noise occurrence predicted period, so that the shift register substantially suspends shifting while receiving the clock pulse during the noise occurrence predicted period.

The solid-state imaging device may include a reading prohibiting unit which prohibits transmitting, during the noise occurrence predicted period, the column selecting signal provided from the shift register.

This structure prohibits the column selecting signal from transmitting to the first line memory during the noise occurrence predicted period, which makes possible reading fewer signals which do not form an image and thus are unnecessary. In addition, this structure can reduce power consumption during the noise occurrence predicted period.

An imaging apparatus according to an aspect of the present invention is structured in a similar manner as the above solid-state imaging device.

The present invention contributes to the reduction in noise interference in pixel signals forming an image. As a result, image fixed pattern vertical line noise or a vertical strip is reduced.

FURTHER INFORMATION ABOUT TECHNICAL BACKGROUND TO THIS APPLICATION

The disclosure of Japanese Patent Application No. 2008-246858 filed on Sep. 25, 2008 including specification, drawings and claims is incorporated herein by reference in its entirety.

The disclosure of PCT application No. PCT/JP2009/004748 filed on Sep. 18, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Hereinafter Embodiments in the present invention shall be described with reference to the drawings.

Embodiment 1

Figure 1:
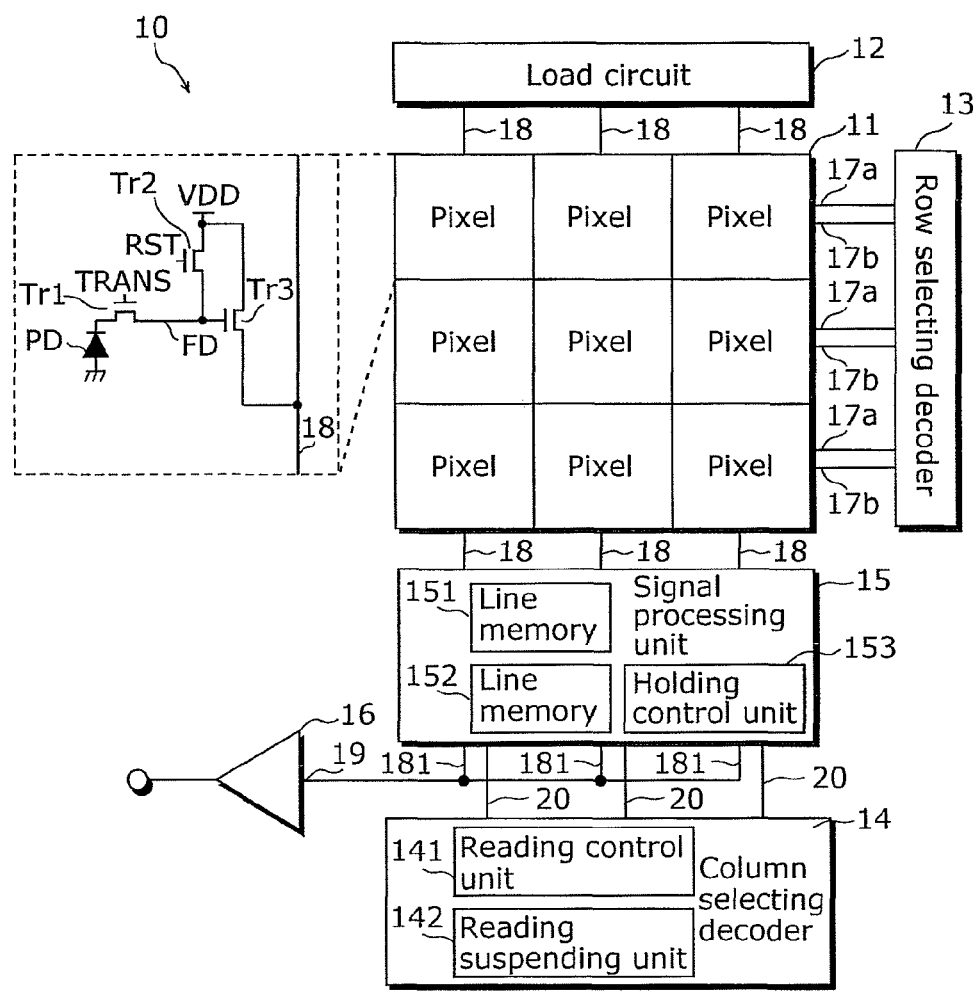
FIG. 1 is a schematic view of a solid-state imaging device according to Embodiment 1 in the present invention.

FIG. 1 is a schematic view of a solid-state imaging device according to Embodiment 1 in the present invention.

FIG. 1 shows that a solid-state imaging device 10 includes an image area 11, a load circuit 12, a row selecting decoder 13, a column selecting decoder 14, a signal processing unit 15, and an output unit 16.

The image area 11 includes pixels arranged in a matrix. Each of the pixels includes a photodiode PD, a floating diffusion FD, and transistors Tr1, Tr2, and Tr3. The gates of the transistors Tr1 and Tr2 respectively connect to row signal lines 17a and 17b.

Embodiment 1 has features in structures of the column selecting decoder 14 and the signal processing unit 15, and a driving technique of the solid-state imaging device 10.

The column selecting decoder 14 includes a reading control unit 141, and a reading postponing unit 142. The signal processing unit 15 includes two row memories 151 and 152, and a holding control unit 153.

The row memories 151 and 152 take turns to (i) store at a time pixel signals provided from the image area 11 for each row, and (ii) sequentially provide the stored pixel signals. One of the two row memories provides the pixel signals while the other is holding pixel signals.

During a horizontal readout period, the reading control unit 141 sequentially reads out the stored pixel signals, and causes a first line memory; namely one of the two row memories 151 and 152 to provide the read pixel signals.

During the horizontal readout period, the holding control unit 153 causes a second line memory; namely the other one of the two row memories 151 and 152, to hold pixel signals provided from one of the rows included in the image area 11.

During a noise occurrence predicted period, the reading postponing unit 142 causes the reading control unit 141 to postpone the reading of the pixel signals from the first line memory. Here the noise occurrence predicted period is included in the horizontal readout period. In the noise occurrence predicted period, the occurrence of noise is predicted due to an operation of the holding control unit 153. In the noise occurrence predicted period, variations in electric potential frequently occur on a power line and a ground line due to the operation of the holding control unit 153. When the pixel signals are stored at a time, for example, the pixel signals are provided from all of column signal lines 18 each connects to a corresponding one of pixel columns. This is susceptible to the variations in electric potential on the power line and the ground line.

Figure 2:
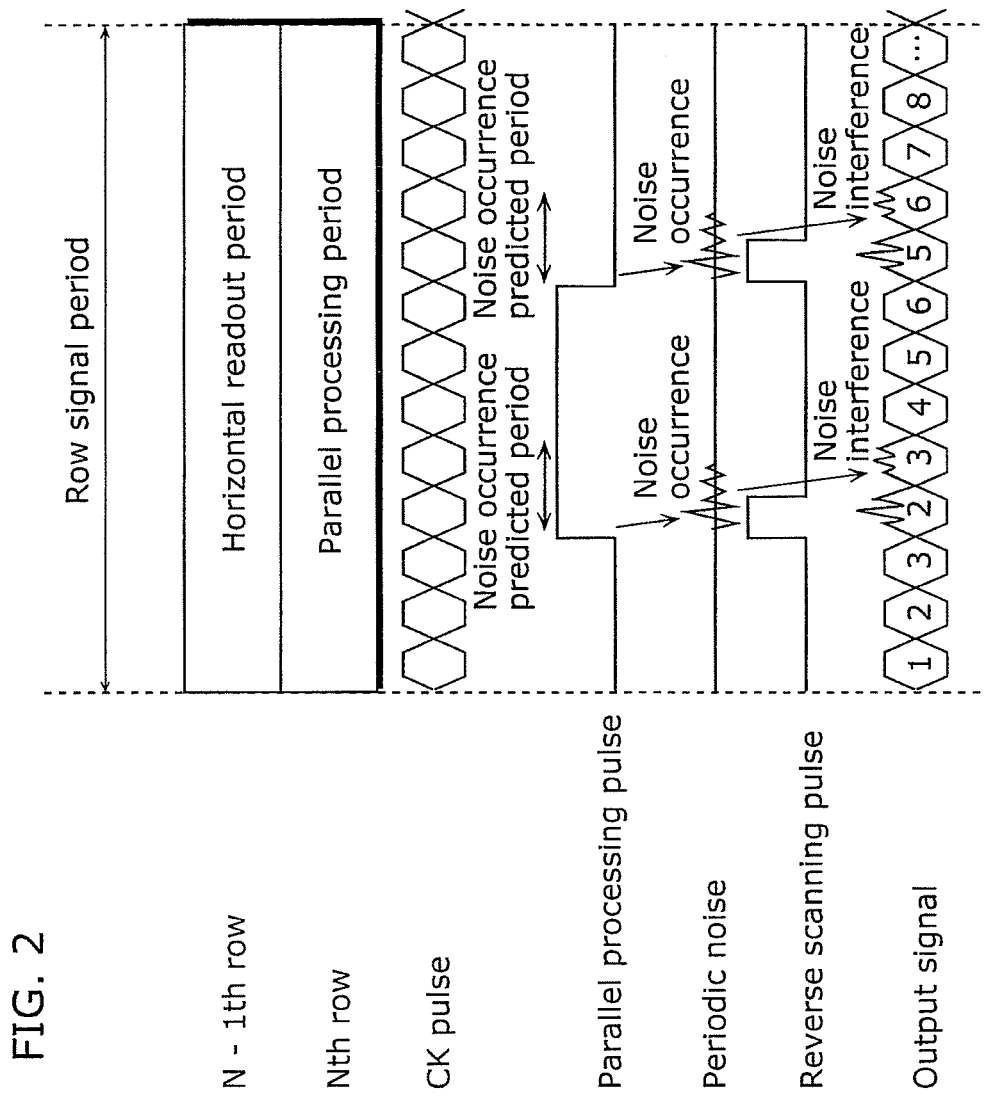
FIG. 2 shows an operation for postponing reading of pixel signals in column order according to Embodiment 1 in the present invention.

FIG. 2 shows an operation for postponing the reading of the pixel signals in column order according to Embodiment 1 in the present invention. It is noted that the phrase "in column order" found in Embodiments means "in the numerical order of the column numbers" in the case where a number is assigned to each column.

The numbers found in output signals in FIG. 2 represent column numbers selected by the column selecting decoder 14. In Embodiment 1, the column selecting decoder 14 has the following features: The column selecting decoder 14 includes a shift register capable of shifting in forward and backward directions, and shifts the shift register in (i) the forward direction when a reverse scanning pulse is at the low level, and (ii) the backward direction when a reverse scanning pulse is at the high level. In principle, the reverse scanning pulse is designed to be brought to the low level during the horizontal readout period. The reverse scanning pulse is exceptionally set to be brought to the high level in the first half of the noise occurrence predicted period, and to the low level in the last half of the noise occurrence predicted period. Here, in the noise occurrence predicted period, noise is predicted to occur due to the parallel processing pulse.

Designing the reverse scanning pulse as described above allows the pixel signals to be read in column order during the horizontal readout period, and makes possible postponing the reading of the pixel signals in column order during the noise occurrence predicted period.

Parallel processing pulses are supplied to pixels in a row and the signal processing unit 15 in order to cause the signal processing unit 15 to hold in parallel the pixel signals found in the row. Specifically, the parallel processing pulses include the following pulses: The pulses supplied to the pixels such as an electronic shutter pulse, a reset pulse, and a read pulse; and the pulses supplied to the signal processing unit 15 such as a sample hold (SH) pulse, and a clamp (CP) pulse.

FIG. 2 exemplifies the occurrence of the noise over (i) the forth and fifth pixel periods due to the rise in the parallel processing pulse, and (ii) the ninth and tenth pixel periods due to the fall in the parallel processing pulse. The pixel period is a period to take for reading a pixel signal for one pixel during the horizontal readout period. The example in FIG. 2 shows that the pixel signals in the second and the third columns are respectively read again in the fourth and the fifth pixel periods, so that the reading is postponed for the pixel signals in the fourth and the following columns. The pixel signals in the fourth and the following columns are read in the sixth and the following pixel periods, which is after a lapse of the noise occurrence predicted period. Similarly, the pixel signals in the fifth and the sixth columns are respectively read again in the ninth and the tenth pixel periods, so that the reading is postponed for the pixel signals in the seventh and the following columns. The pixel signals in the seventh and the following columns are read in the 11th and the following pixel periods, which is after the noise occurrence predicted period has elapsed.

As described above, the pixel signals are read in column order during the horizontal readout period other than the noise occurrence predicted period. Accordingly, the image noise on the image screen is reduced.

Figure 3:
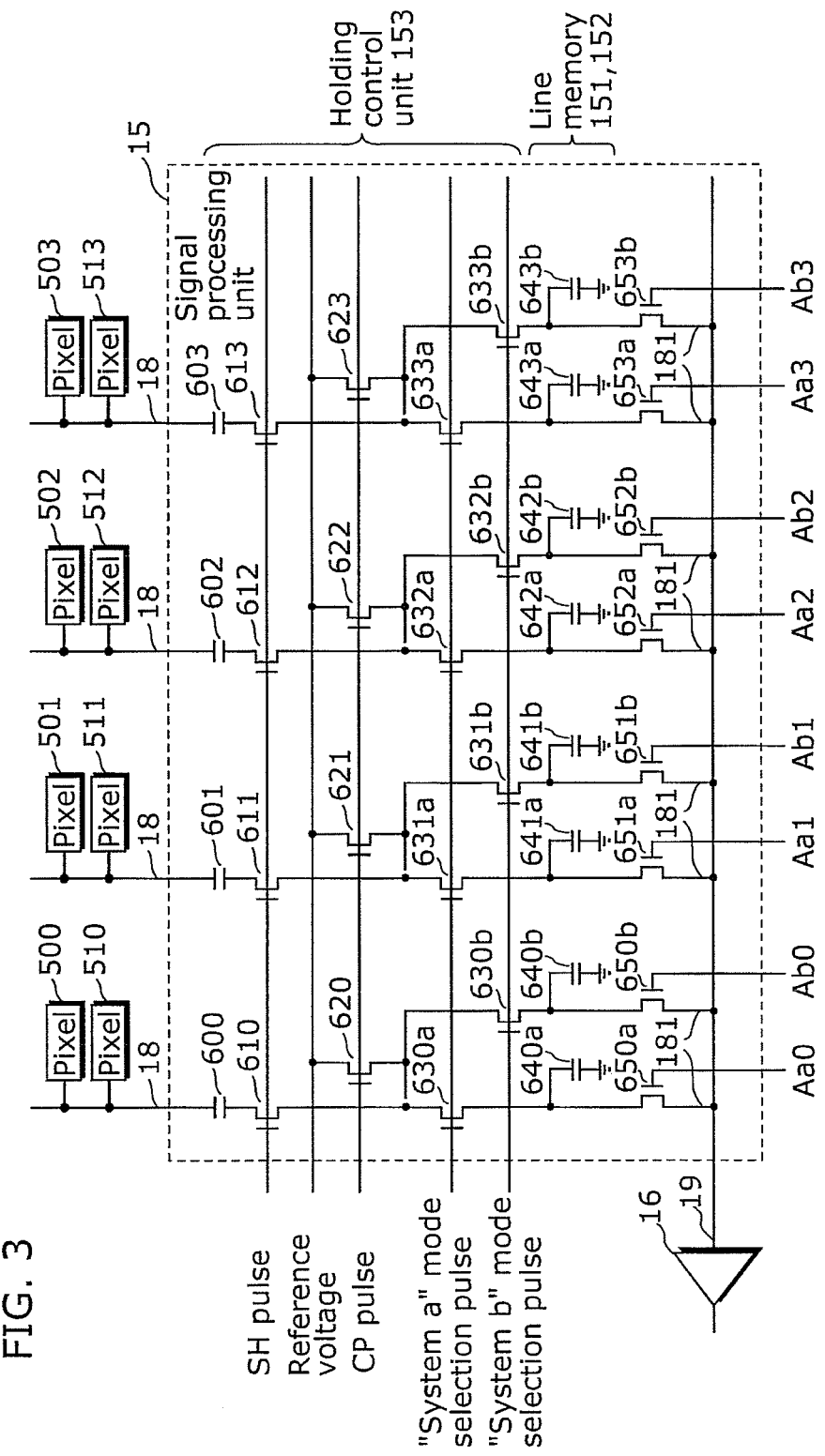
FIG. 3 shows a structure of a signal processing unit according to Embodiment 1 in the present invention.

FIG. 3 shows a structure of the signal processing unit 15 according to Embodiment 1 in the present invention.

The circuit structures in the signal processing unit 15 are the same for each column. Focus on one column (for example, a first column including pixels 501 and 511); the column signal line 18 branches off in a "system a" (including a transistor 631a, a capacitor 641a, and a transistor 651a), and a "system b" (including a transistor 631b, a capacitor 641b, and a switch transistor 651b), so that the signal processing unit 15 can, in parallel, read the pixel signals of pixels found in one row, and hold the pixel signals of pixels found in another row. The capacitors 641a and 641b work as memory cells for holding the pixel signals. The electric potential of the pixel signals held in the memory cell is supplied to a horizontal common signal readout line 19 via column selecting switches (the switch transistors 651a and 651b) and column signal lines 181.

Each capacitor included in the systems "a" and "b" works as a memory cell to hold the pixel signals. The capacitors (640a, 641a, 642a, and 643a) included in the "system a" form the line memory 151. The capacitors (640b, 641b, 642b, and 643b) included in the "system b" form the line memory 152.

Capacitors 600, 601, ..., transistors 610, 611, ..., transistors 620, 621, ..., transistors 630a, 631a, ..., and transistors 630b, 631b, ... form the holding control unit 153.

Figure 4:
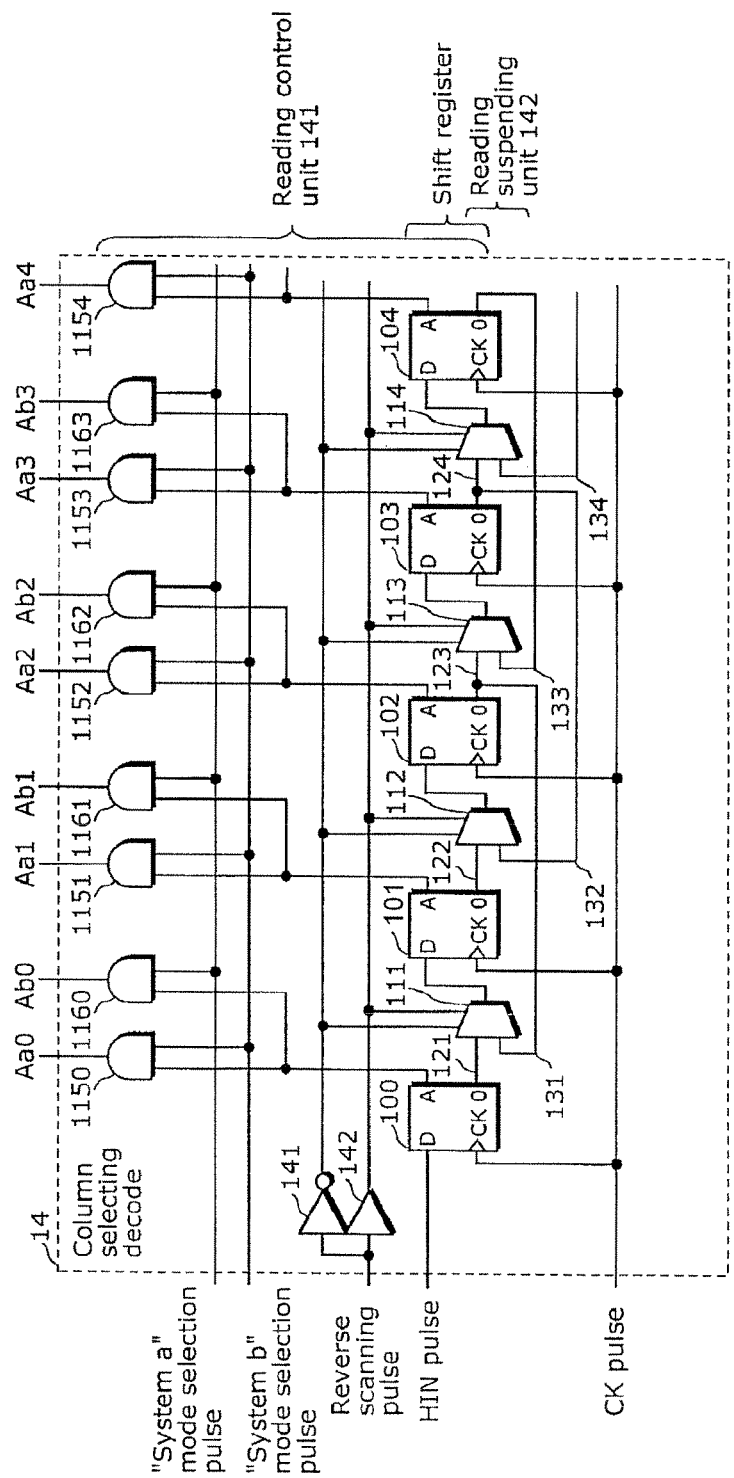
FIG. 4 shows a structure of a column selecting decoder according to Embodiment 1 in the present invention.
Figure 5:
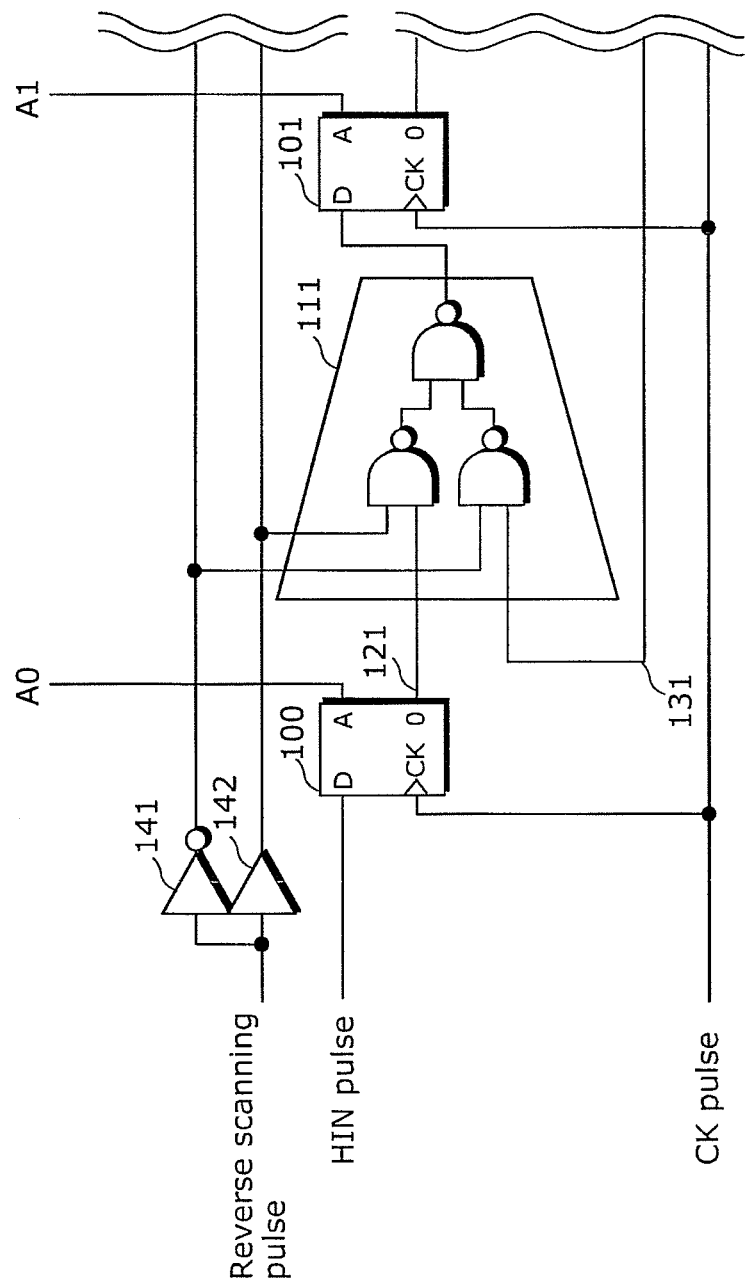
FIG. 5 shows a structure of the column selecting decoder according to Embodiment 1 in the present invention.

FIGS. 4 and 5 show a structure of the column selecting decoder 14 according to Embodiment 1 in the present invention.

The circuits in the column selecting decoder 14 are the same in structure for each column. The circuits in the shift register shift register are the same in structure for each column.

Focus on one column (for example, a first column); the input terminal (D) of a flip-flop 101 connects to the output terminal (Q) of a flip-flop 100 and to the output terminal (Q) of a flip-flop 102 via a selector 111. The output terminal (A) of the flip-flop 101 connects to the signal processing unit 15 via a selecting signal line 20. The clock terminal (CK) of the flip-flop 101 receives a clock pulse. The selector 111 provides (i) an output signal from the flip-flop 100 to the flip-flop 101 when the reverse scanning pulse is in the low level, and (ii) an output signal from the flip-flop 102 to the flip-flop 101 when the reverse scanning pulse is at the high level. This structure allows the shift register to switch between a forward-direction shift and a backward-direction shift. In other words, the shift register has unit registers of stages. Between two unit registers, one selector (one of 111 to 114) is provided. Having the selectors 111 to 114, the shift register can selectively provide an output signal of each of the unit registers to either the unit register in a subsequent stage of the each unit register (the forward-direction shift) or a unit register in a stage ahead of the each unit register (the backward-direction shift). Hence the shift register can substantially suspend shifting while receiving the clock pulse during the noise occurrence predicted period. The selecting signal line 20, which connects the output terminal (A) of the flip-flop 101 and the signal processing unit 15, branches off in the "system a" including an AND circuit 1151 and the "system b" including an AND circuit 1161. The AND circuit 1151 generates the logical AND Aa1 of (i) an output signal A1 from the flip-flop 101 and (ii) a "system b" mode selection pulse. The generated logical AND Aa1 is sent to the gate of the transistor 651a. The AND circuit 1161 generates the logical AND Ab1 of (i) the output signal A1 from the flip-flop 101 and (ii) a "system a" mode selection pulse. The generated logical AND Ab1 is sent to the gate of the transistor 651b included in the signal processing unit 15. The "system a" mode selection pulse and the "system b" mode selection pulse exclusively asserts (go high level). Thus when the "system a" mode selection pulse asserts, the reading control unit 141 sequentially reads-out and provides the pixel signals from the line memory in the "system a". When the "system b" mode selection pulse asserts, on the contrary, the reading control unit 141 sequentially reads-out and provides the pixel signals from the line memory in the "system b".

Figure 6:
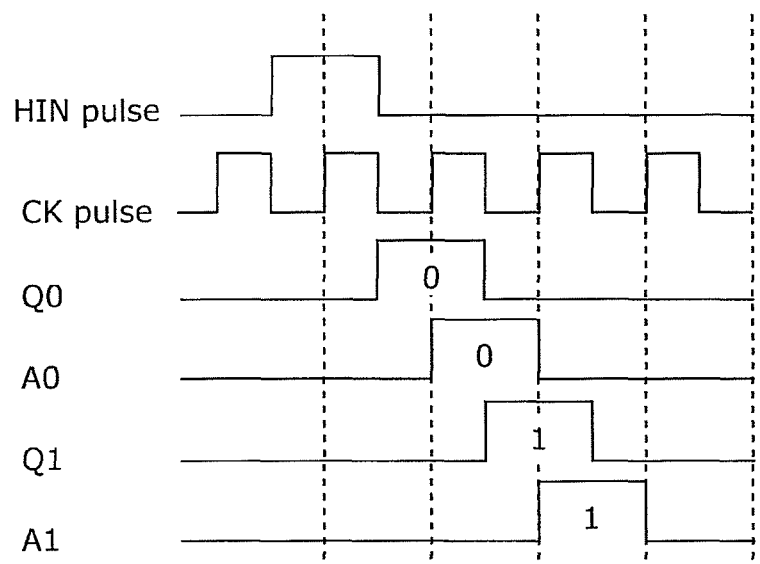
FIG. 6 shows a relationship between output signals on an output terminal (Q) and an output terminal (A) in a flip-flop.

FIG. 6 shows a relationship found in the flip-flop; the relationship between an output signal from the output terminal (Q) and an output signal from the output terminal (A). FIG. 6 shows only the signals corresponding to unit registers 100 and 101 respectively provided in the zeroth and the first columns. When a start pulse (HIN pulse) is provided to the input terminal (D) of the unit register 100, the shift register executes shifting in synchronization with the clock pulse (CK).

FIGS. 3 and 6 show that the "system a" mode selection pulse is designed to the low level when the "system b" mode selection pulse is set to the high level, and vice versa. Hence the "system b" can hold the pixel signals while the "system a" is reading the pixel signals, and the "system b" can read the pixel signals while the "system a" is holding the pixel signals.

Figure 7:
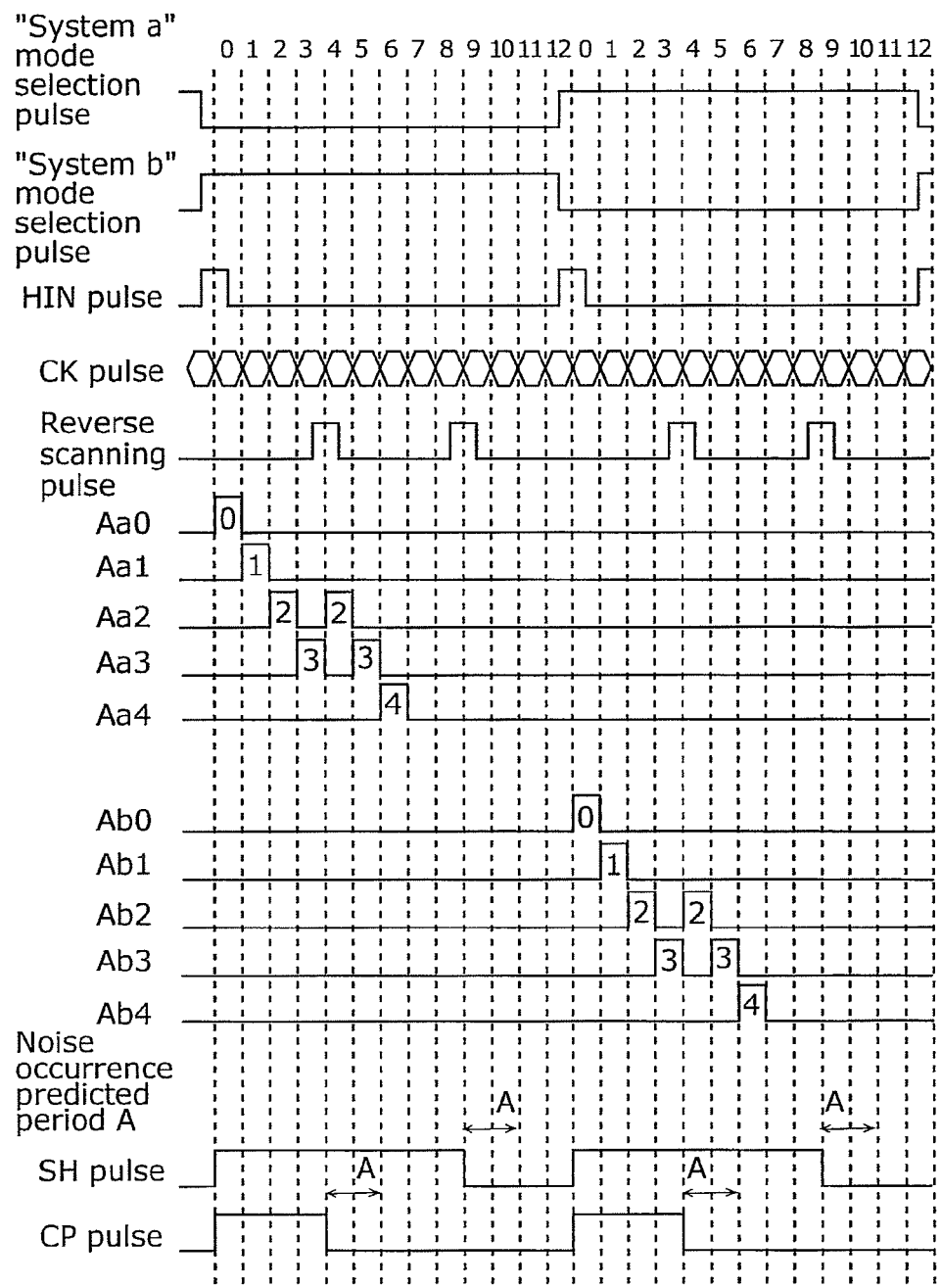
FIG. 7 shows an operation of the column selecting decoder according to Embodiment 1 in the present invention.

FIG. 7 shows an operation of the column selecting decoder 14 according to Embodiment 1 in the present invention.

The column selecting decoder 14 start shifting, receiving the start pulse (HIN pulse) as a trigger. When the "system a"-mode selection pulse is at the low level and the "system b" mode selection pulse is at the high level, the pixel signals are read from the line memory in the "system a", and the pixel signals are held on a row basis in the line memory in the "system b". When the "system a" mode selection pulse is at the high level and the "system b" mode selection pulse is in the low level, the pixel signals are held on a row basis in the line memory in the "system a", and the pixel signals are read from the line memory in the "system b".

As FIG. 7 shows, the column selecting decoder 14 shifts the shift register (i) in the forward direction when the reverse scanning pulse is at the low level, and (ii) in the backward direction when the reverse scanning pulse is at the high level. The reverse scanning pulse is designed to go (i) high level indicating the backward direction in the first half of the noise occurrence predicted period, and (ii) low level indicating the forward direction in the last half of the noise occurrence predicted period.

Exemplified here as the noise occurrence predicted period is a period in which noise occurs due to the falls of an SH pulse and a CP pulse. The reverse scanning pulse is designed to go high level in response to the falls of the SH pulse and the CP pulse. Designing the reverse scanning pulse as described above makes possible postponing the sequential reading of the pixel signals during the noise occurrence predicted period.

Figure 8:
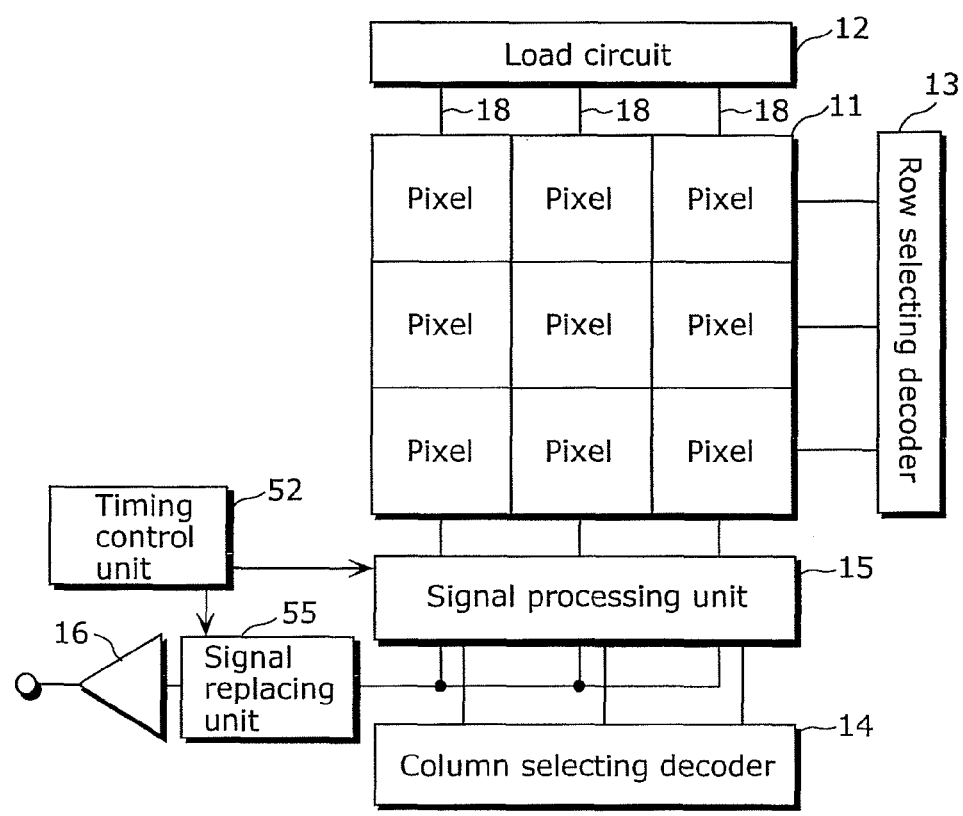
FIG. 8 shows a structure of the solid-state imaging device including a signal replacing unit according to Embodiment 1 in the present invention.

In addition to FIG. 1, FIG. 8 shows a structure of the solid-state imaging device including a timing control unit 52 and a signal replacing unit 55.

The timing control unit 52 is a timing generator generating various kinds of pulse signals.

The signal replacing unit 55 replaces an electric potential of a horizontal common signal readout line 19 immediately before the noise occurrence predicted period ends with either an electric potential of a pixel signal provided immediately before the noise occurrence predicted period starts or a reference electric potential. Described below is how the signal replacing unit 55 is effective.

Figure 9:
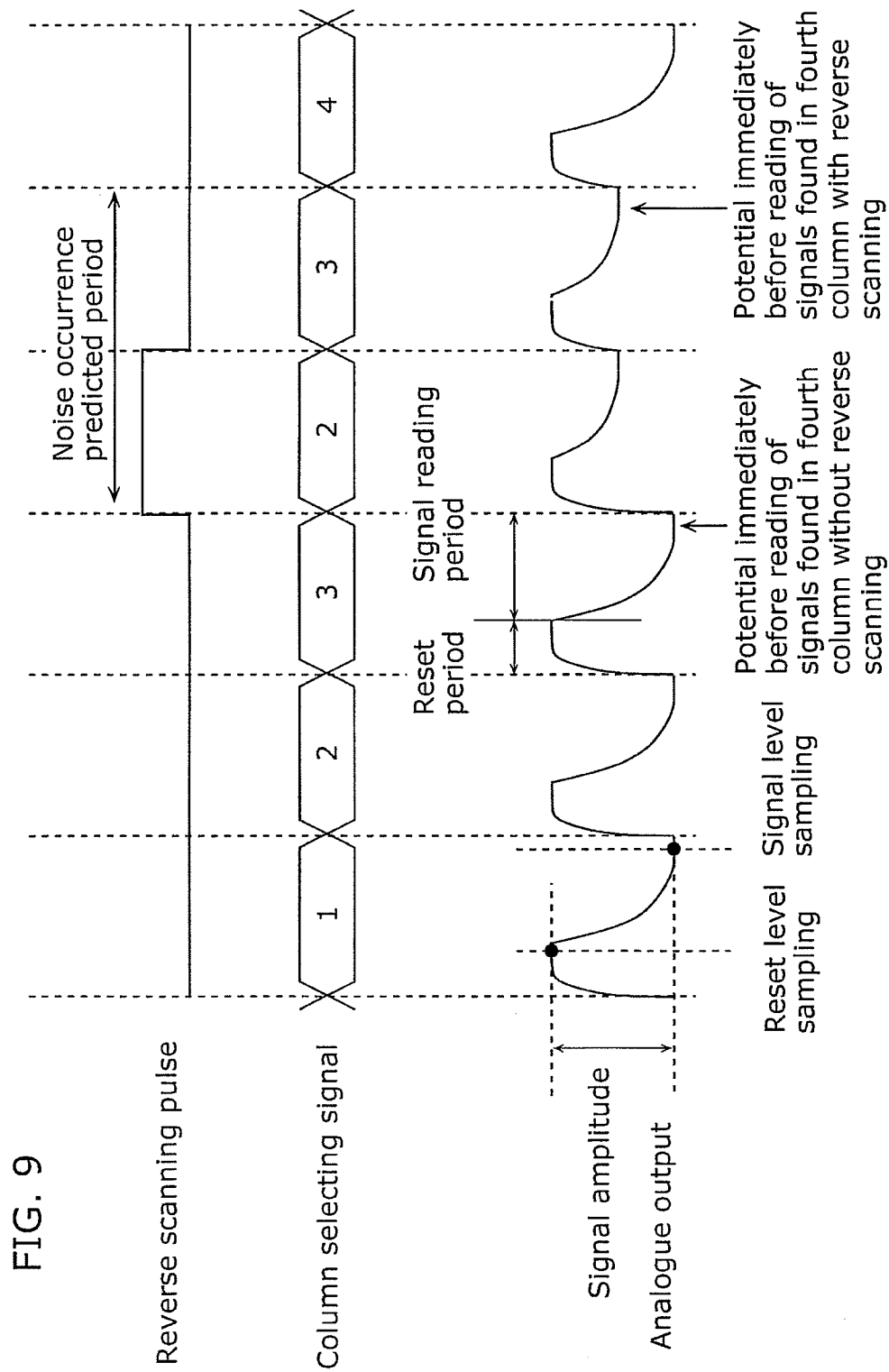
FIG. 9 shows an analogue waveform in the reverse scanning according to Embodiment 1 in the present invention.

FIG. 9 shows an analogue output waveform in the reverse scanning. A pixel reading period includes a reset period and a signal reading period; the reset period in which the horizontal common signal readout line is reset, and the signal reading period in which a signal found in a column selected by the column selecting decoder 14 is read. Each analogue output in the reset period and the signal reading period is sample-held by a back stage processing circuit, and the difference of the analogue outputs is recognized as a pixel signal At the high level period and the following pixel reading period shown in FIG. 9, the reverse scanning pulse destructively reads out signals held in a line memory, and reads the signals again. Hence the signal level goes low. Thus the level, of the horizontal common signal readout line in the fourth column, immediately before resetting differs from the level, of the horizontal common signal readout line, observed when the signals in the third column are read at first. Accordingly, the level of the horizontal common signal readout line before reading of the signals in the forth column differs when the reverse scanning is executed and when the reverse scanning is not executed. The difference in the level gives a tiny effect on the sampling level of the reset. Hence when no reverse scanning is executed, the fixed pattern vertical line noise occurs in the difference pixel signal in the fourth column. In order to reduce the fixed pattern vertical line noise, the signal replacing unit 55 shown in FIG. 8 is provided in order to replace the level immediately before the reading of the signals found in the fourth column with an appropriate electric potential. The appropriate electric potential here is preferably the signal level in the third column.

Figure 10:
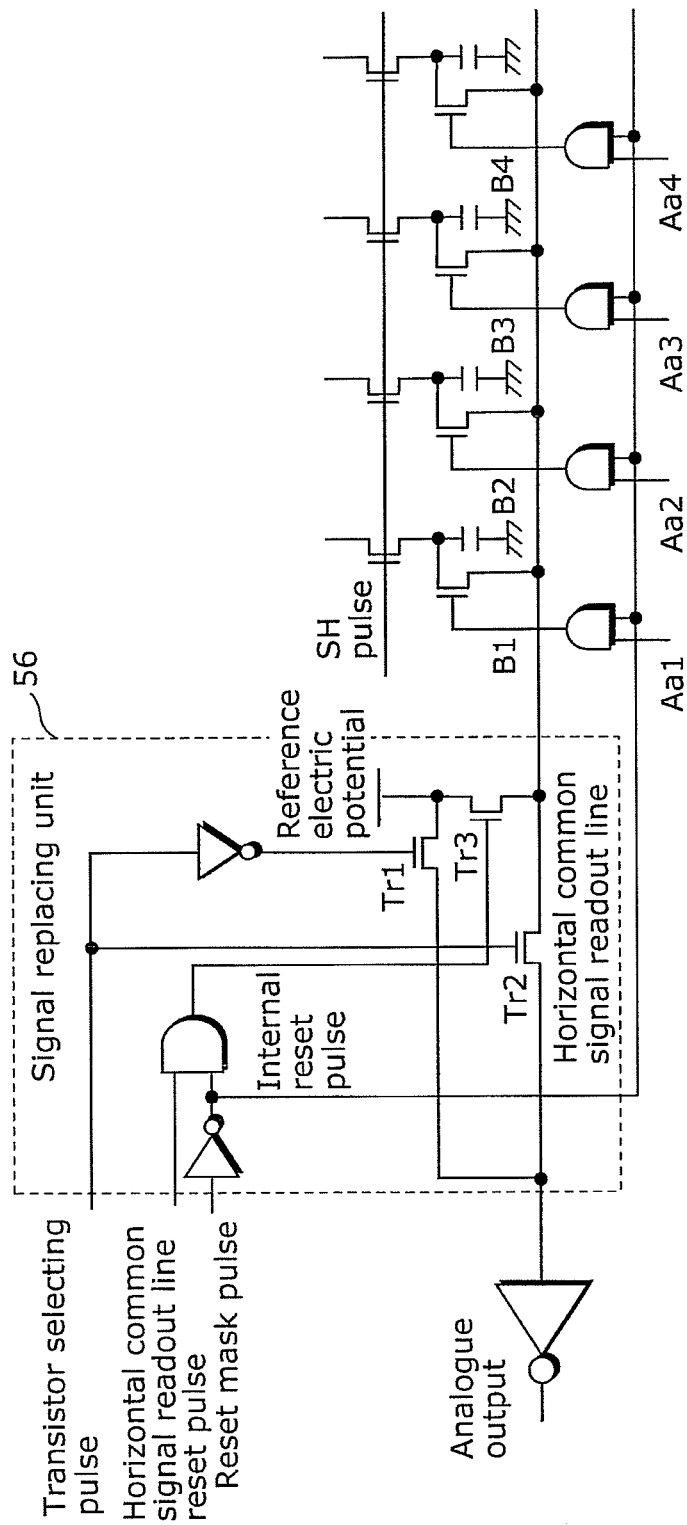
FIG. 10 exemplifies a circuit structure of the signal replacing unit according to Embodiment 1 in the present invention.
Figure 11:
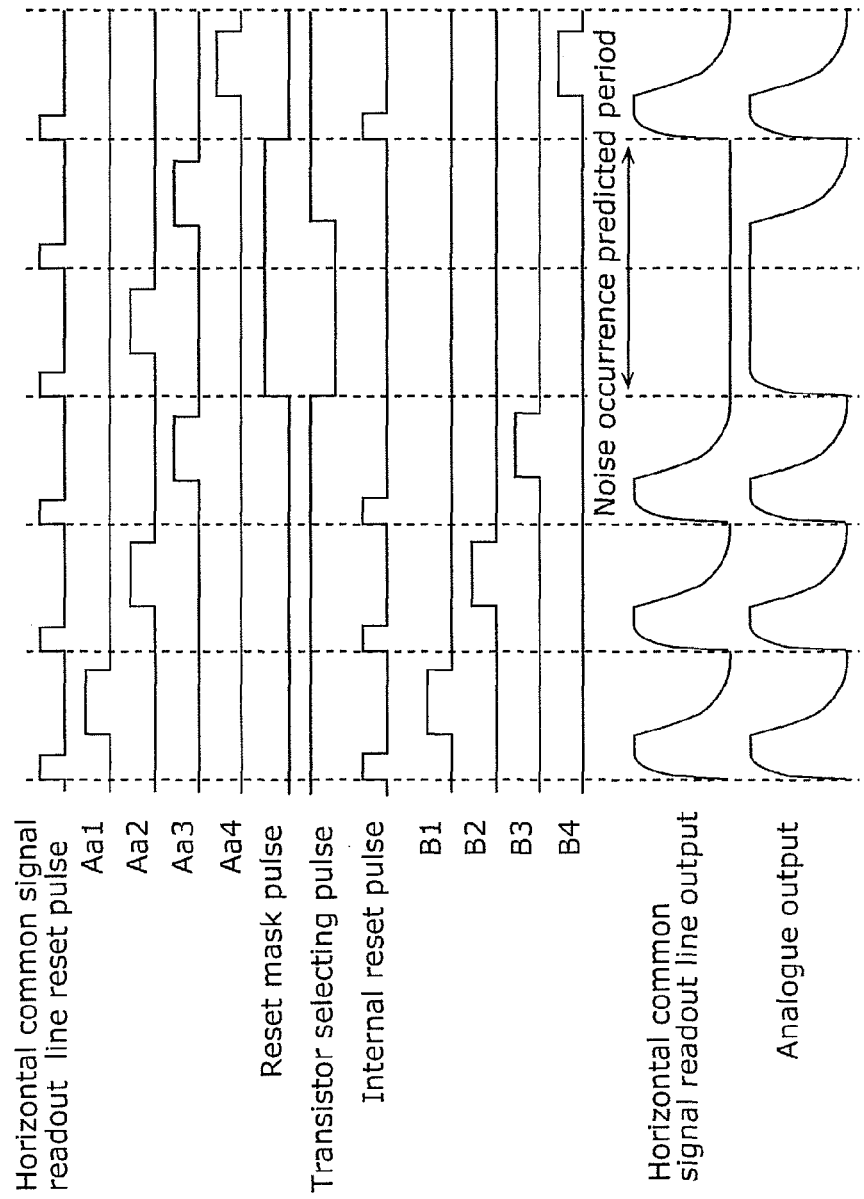
FIG. 11 shows how the exemplified circuit according to Embodiment 1 in the present invention drives.

FIG. 10 is a circuit diagram showing a structural example of the signal replacing unit 55 for reducing the fixed pattern vertical line noise, and a part of the line memory in the "system a". There is no relationship between the description of the function of the signal replacing unit 55 and two systems of the row memories. Hence the structural example below is described with one system of the line memory. The signal replacing unit 55 has a transistor Tr2 for switching between the horizontal common signal readout line and an analogue output amplifier, and a transistor Tr1 for switching between the reference electric potential and the analogue output amplifier. The signal replacing unit 55 also has a transistor Tr3 for resetting the horizontal common signal readout line, and an AND gate for masking a reset pulse supplied to the gate of the transistor Tr3. The transistor Tr1 and the transistor Tr2 are complementarily selected by a transistor selecting pulse.

FIG. 10 exemplifies how the signal replacing unit 55 operates. Since a reset mask pulse does not reset the horizontal common signal readout line in the reverse scanning, the output of the horizontal common signal readout line during the reverse scanning period is fixed to the signal level in the third column. In the example, the transistor selecting pulse causes the input level of the analogue output amplifier during the reverse scanning period to be fixed to the reference electric potential. The input level may be high impedance. This is because the charge is held in the input parasite capacitance of the analogue output amplifier, and the input level is fixed to the reference electric potential or another electric potential.

Switching the transistor selecting pulse to the high level before reading the signals out from the fourth column immediately after the reverse scanning makes the input level of the output amplifier to approximately the signal level of the third column. Due to the parasitic capacitance between the analogue output amplifier and the transistor Tr2, the level of the horizontal common signal readout line slightly differs from that of the signal level of the third column in a narrow sense; however, this slight difference can be ignored according to FIG. 9.

Figure 12A:
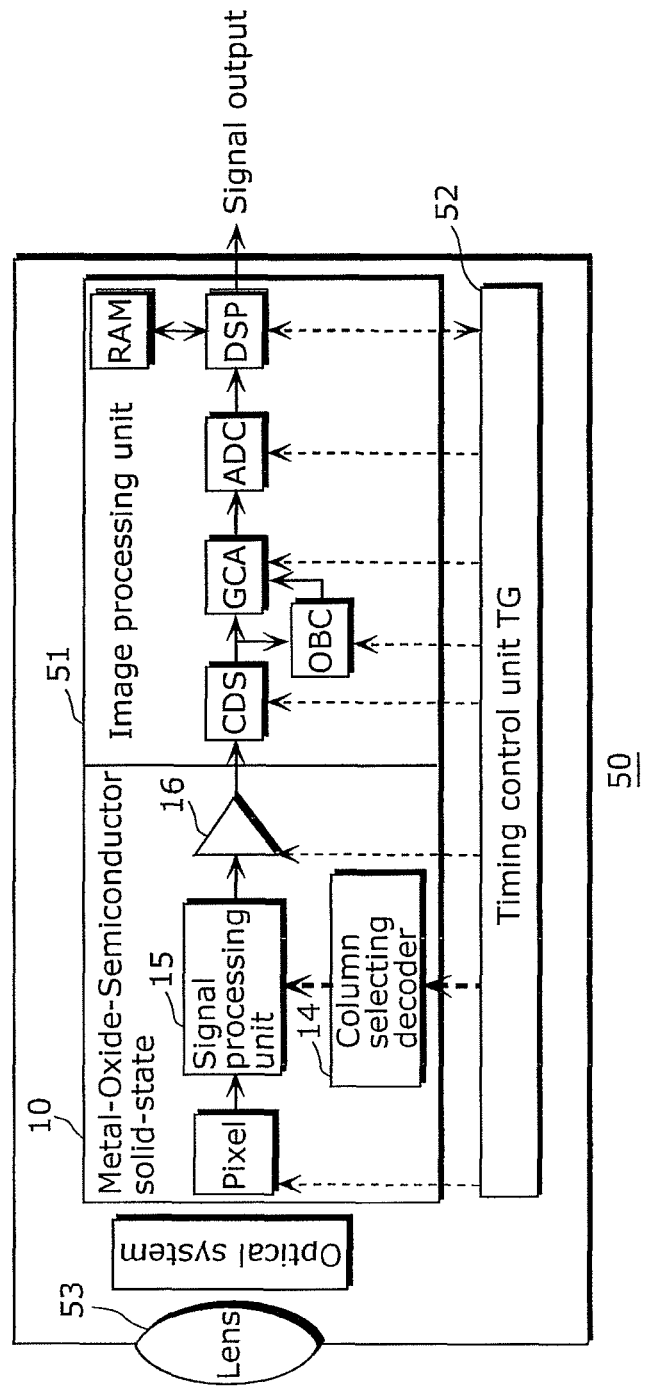
FIG. 12A shows a structure of a camera according to Embodiment 1 in the present invention.

FIG. 12A shows a structure of a camera (imaging device) according to Embodiment 1 in the present invention.

A camera 50 includes the solid-state imaging device 10, an image processing unit 51, the timing control unit 52, a lens 53, and an optical system. The timing control unit 52 supplies a control signal to each of functional units included in the solid-state imaging device 10 and the image processing unit 51. In Embodiment 1, as shown in FIG. 2, the pixel signals which have already been read are read again during the noise occurrence predicted period (In reality, the pixel signals are read via the destructive readout. Hence the pixel signals read again and the already-read pixel signals differ in the signal level). From among the pixel signals read from the solid-state imaging device 10, the image processing unit 51 discards the pixel signals read during the noise occurrence predicted period. Hence the camera 50 reduces the image fixed pattern vertical line noise or a vertical strip found on the image screen.

Figure 12B:
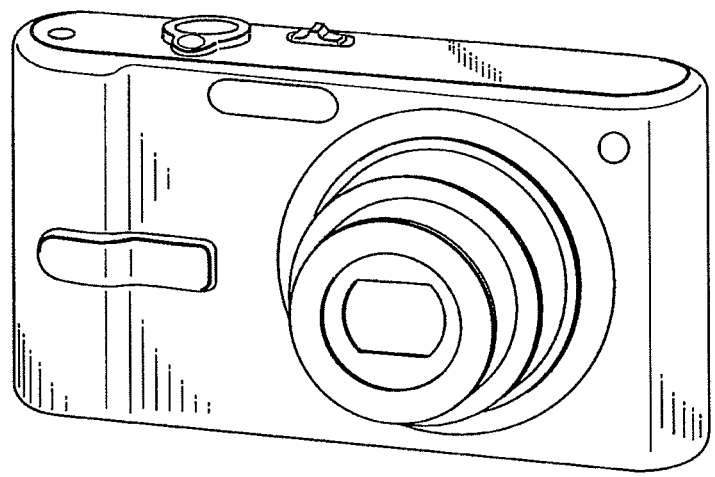
FIG. 12B is a overall view of a digital still camera according to Embodiment 1 in the present invention.
Figure 12C:
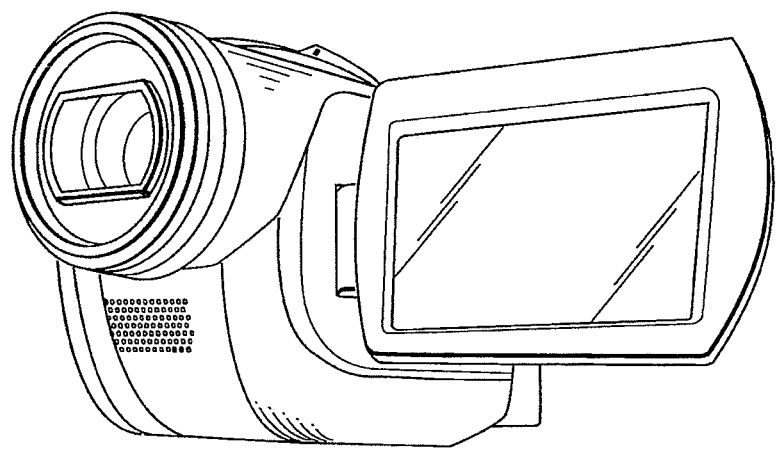
FIG. 12C is a overall view of a digital video camera according to Embodiment 1 in the present invention.

FIGS. 12B and 12C are respective overviews of a digital still camera and a digital video camera according to Embodiment 1 in the present invention.

Embodiment 2

Embodiment 2 introduces a technique which differs from that of Embodiment 1 to read the pixel signals in column order. Other than the reading technique, Embodiment 2 is similar to Embodiment 1; therefore, the details of Embodiment 2 shall be omitted.

Figure 13:
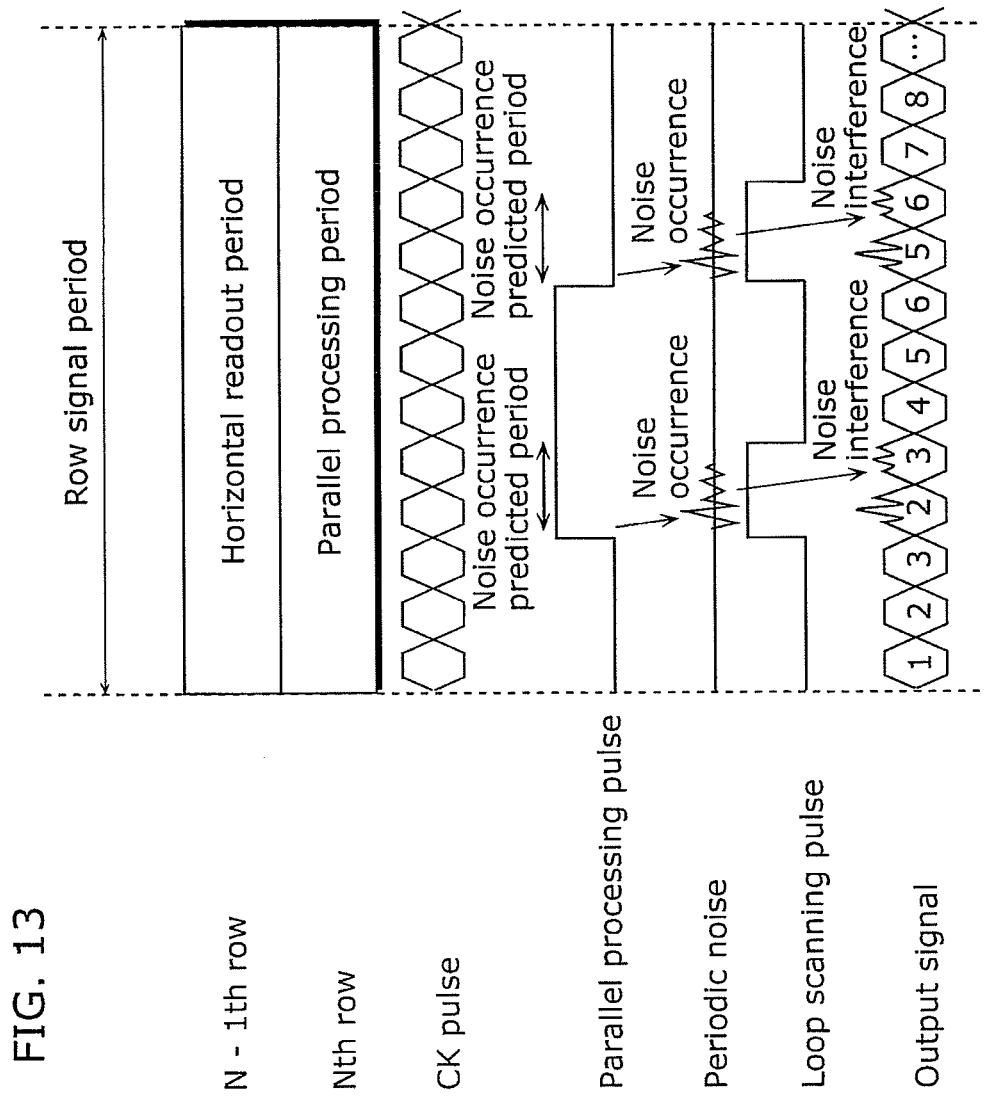
FIG. 13 shows an operation for postponing reading of pixel signals in column order according to Embodiment 2 in the present invention.

FIG. 13 shows an operation for postponing reading of the pixel signals in column order according to Embodiment 2 in the present invention.

In Embodiment 2, the column selecting decoder 14 includes a shift register capable of suspending the shift while receiving a clock pulse. The column selecting decoder 14 (i) shifts the shift register when a loop scanning pulse is in the low level, and (ii) suspends shifting the shift register when the loop scanning pulse is at the high level. In principle, the reverse scanning pulse is designed to be brought to the low level during the horizontal readout period. The reverse scanning pulse is exceptionally designed to be brought to the high level during the noise occurrence predicted period. Designing the loop scanning pulse as described above allows the pixel signals to be read in column order during the horizontal readout period, and makes possible postponing the reading of the pixel signals in column order during the noise occurrence predicted period.

FIG. 13 exemplifies the case where the noise occurs in the pixel signals over (i) the forth and fifth pixel periods due to the rise in the parallel processing pulse, and (ii) the ninth and tenth pixel periods due to the fall in the parallel processing pulse. The example in FIG. 13 shows that the pixel signals in the third column are continuously read in the fourth and the fifth pixel periods, so that the reading is postponed for the pixel signals in the fourth and the following columns. The pixel signals in the fourth column and after are read in the sixth pixel period and after, which is after a lapse of the noise occurrence predicted period. Similarly, the pixel signals in the sixth column are continuously read in the ninth and the tenth pixel periods, so that the reading is postponed for the pixel signals in the seventh and the following columns. The pixel signals in the seventh and the following columns are read in the 11th and the following pixel periods, which is after a lapse of the noise occurrence predicted period.

As described above, the pixel signals are read in column order during the horizontal readout period other than the noise occurrence predicted period. Accordingly, the image noise on the image screen is reduced.

Figure 14:
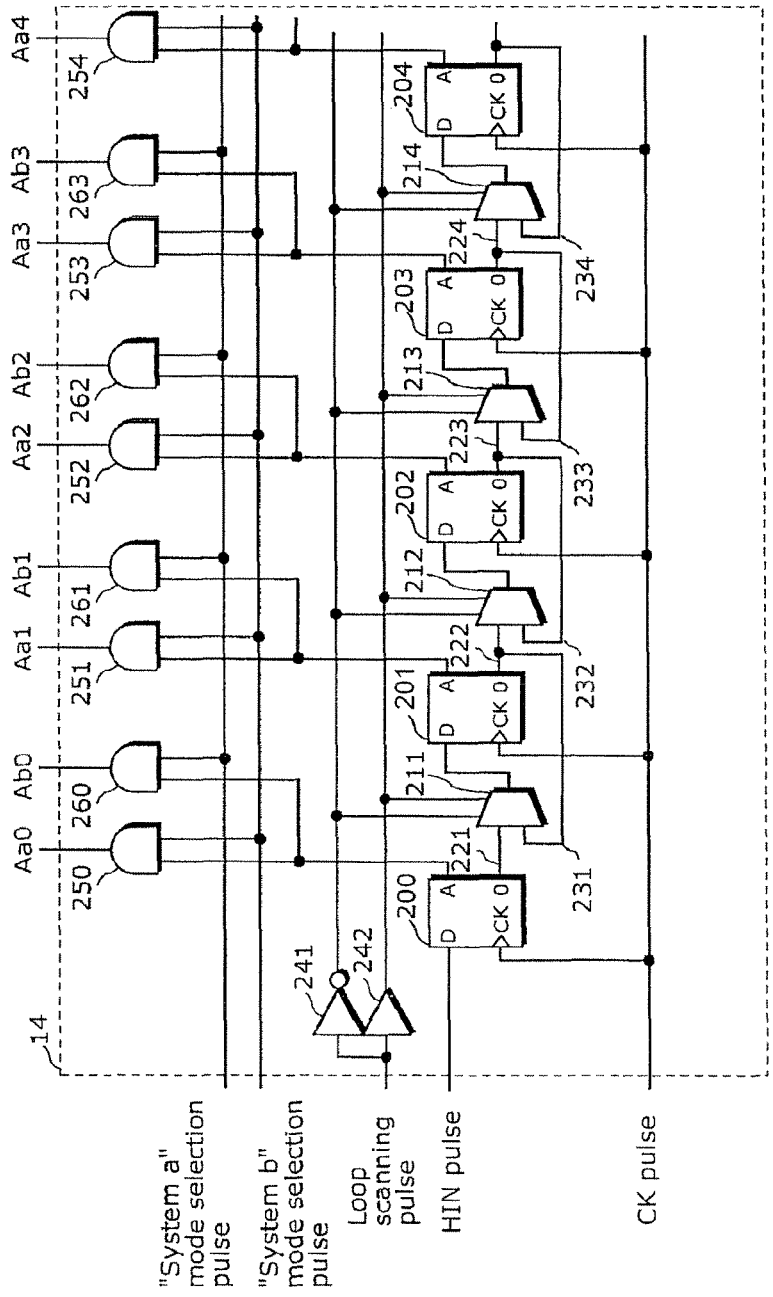
FIG. 14 shows a structure of a column selecting decoder according to Embodiment 2 in the present invention.

FIG. 14 shows a structure of the column selecting decoder 14 according to Embodiment 2 in the present invention.

The circuits in the column selecting decoder 14 are the same in structure for each column.

Focus on one column (for example, a first column); the input terminal (D) of a flip-flop 201 connects to the output terminal (Q) of a flip-flop 200 and to the output terminal (Q) of the flip-flop 201 itself via a selector 211. The output terminal (A) of the flip-flop 201 connects to the signal processing unit 15 via a selecting signal line 20. The clock terminal (CK) of the flip-flop 201 receives a clock pulse. The selector 211 provides (i) an output signal from the flip-flop 200 to the flip-flop 201 when the reverse scanning pulse is at the low level, and (ii) an output signal from the flip-flop 201 to the flip-flop 201 itself when the reverse scanning pulse is at the high level. This structure allows the shift register to suspend the shift while receiving the clock pulse. In other words, the shift register has unit registers of stages. Between two unit registers, one selector (one of 211 to 214) is provided. Having the selectors 211 to 214, the shift register can provide an output signal of each unit register to either a unit register in a back stage (the forward-direction shift) or a unit register included in the shift register itself (substantially suspending the shift). Hence the shift register can substantially suspend shifting while receiving the clock pulse during the noise occurrence predicted period.

Figure 15:
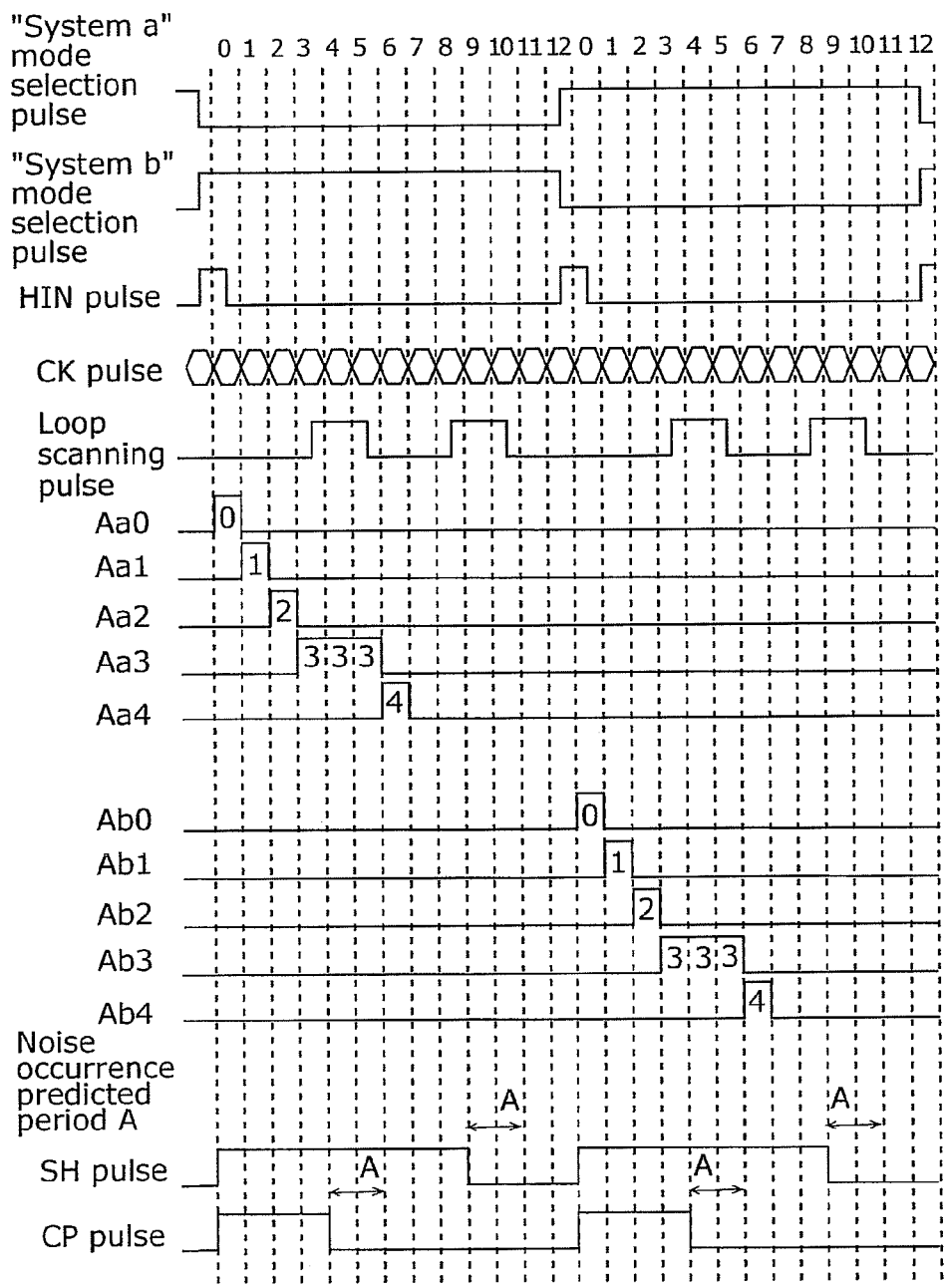
FIG. 15 shows an operation of the column selecting decoder according to Embodiment 2 in the present invention.

FIG. 15 shows an operation of the column selecting decoder 14 according to Embodiment 2 in the present invention.

As shown in FIG. 15, the column selecting decoder 14 (i) shifts the shift register when the loop scanning pulse is in the low level, and (ii) suspends shifting the shift register when the loop scanning pulse is at the high level.

Exemplified here is the case where noise occurs due to the falls of an SH pulse and a CP pulse. The loop scanning pulse is designed to go high level in response to the falls of the SH pulse and the CP pulse. Designing the loop scanning pulse as described above makes possible postponing the sequential reading of the pixel signals.

Embodiment 3

Embodiment 3 differs from Embodiment 1 in that Embodiment 3 prohibits reading of the pixel signals during the noise occurrence predicted period. Other than the prohibition, Embodiment 3 is similar to Embodiment 1; therefore, the details of Embodiment 3 shall be omitted.

Figure 16:
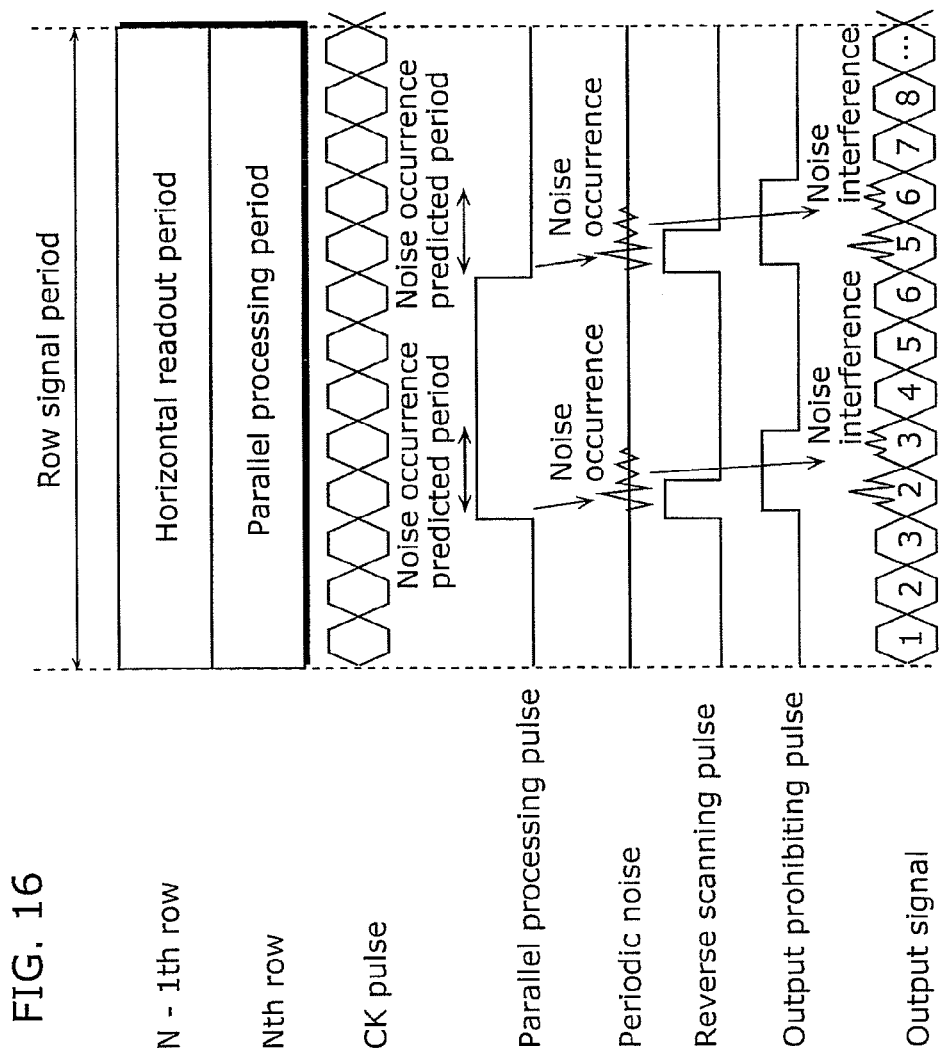
FIG. 16 shows an operation for postponing reading of pixel signals in column order according to Embodiment 3 in the present invention.

FIG. 16 shows an operation for postponing reading of the pixel signals in column order according to Embodiment 3 in the present invention.

In Embodiment 3, the column selecting decoder 14 (i) reads out the pixel signals when an output prohibiting pulse is at the low level, and (ii) cancels reading the pixel signals when the output prohibiting pulse is at the high level. In principle, the output prohibiting pulse is designed to be brought to the low level during the horizontal readout period. The output prohibiting pulse is exceptionally designed to be brought to the high level during the noise occurrence predicted period. Designing the output prohibiting pulse as described above can postpone the reading of the pixel signals in column order during the noise occurrence predicted period, and makes possible reading fewer pixel signals which do not form an image and thus are unnecessary. As described above, unnecessary pixel signals are not read during the noise occurrence predicted period, which contributes to the reduction of power consumption of a circuit for reading the pixel signals and an image processing system.

Figure 17:
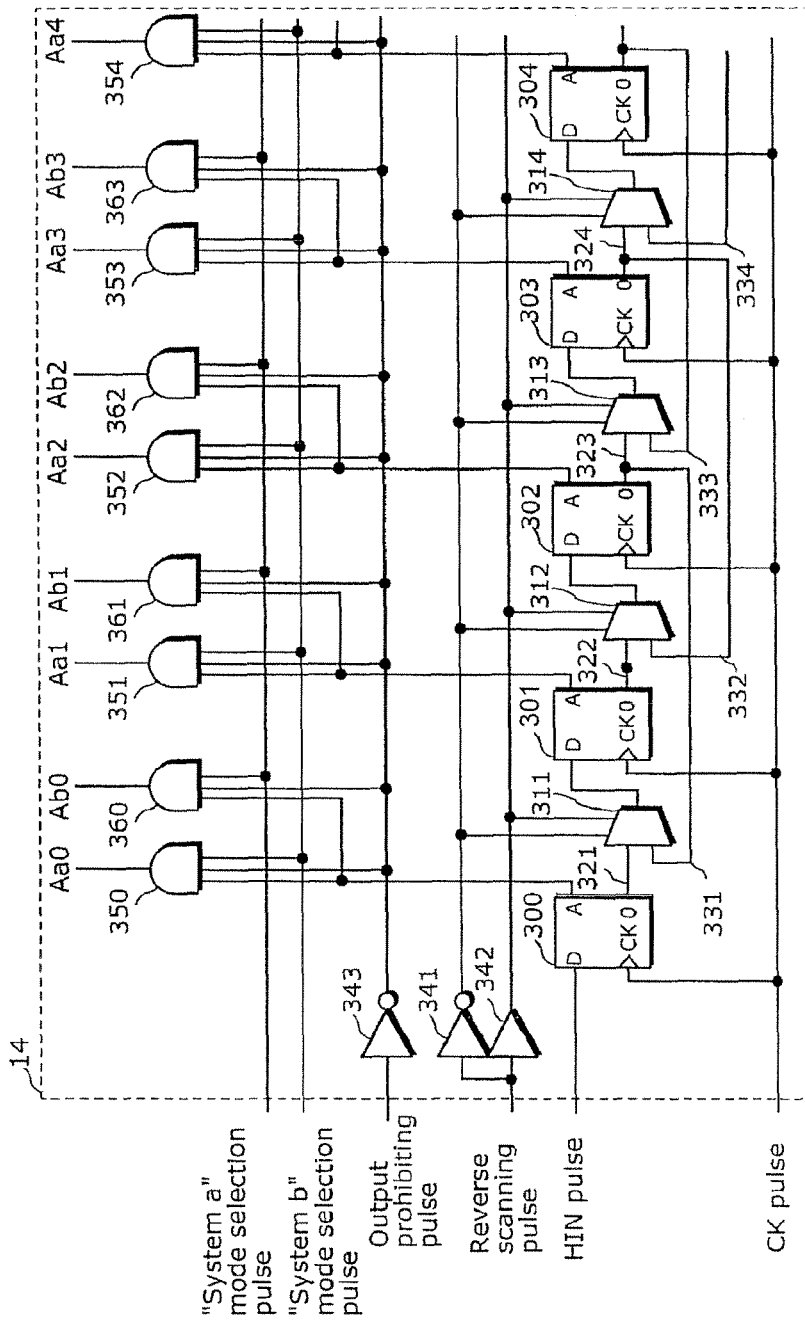
FIG. 17 shows a structure of a column selecting decoder according to Embodiment 3 in the present invention.

FIG. 17 shows a structure of the column selecting decoder 14 according to Embodiment 3 in the present invention.

The circuits in the column selecting decoder 14 are the same in structure for each column.

Focus on one column (for example, a first column). Embodiment 3 differs from Embodiment 1 in that AND circuits 351 and 361 receive an inversion signal of the output prohibiting pulse. In other words, the AND circuit 351 generates the logical AND Aa1 of (i) an output A1 from a flip-flop 301, (ii) a "system b" mode selection pulse, and (iii) the inversion signal of the output prohibiting pulse. The AND circuit 361 generates the logical AND Ab1 of (i) an output A1 from the flip-flop 301, (ii) a "system a" mode selection pulse, and (iii) the inversion signal of the output prohibiting pulse. Other than the above structure, Embodiment 3 is similar to Embodiment 1.

Figure 18:
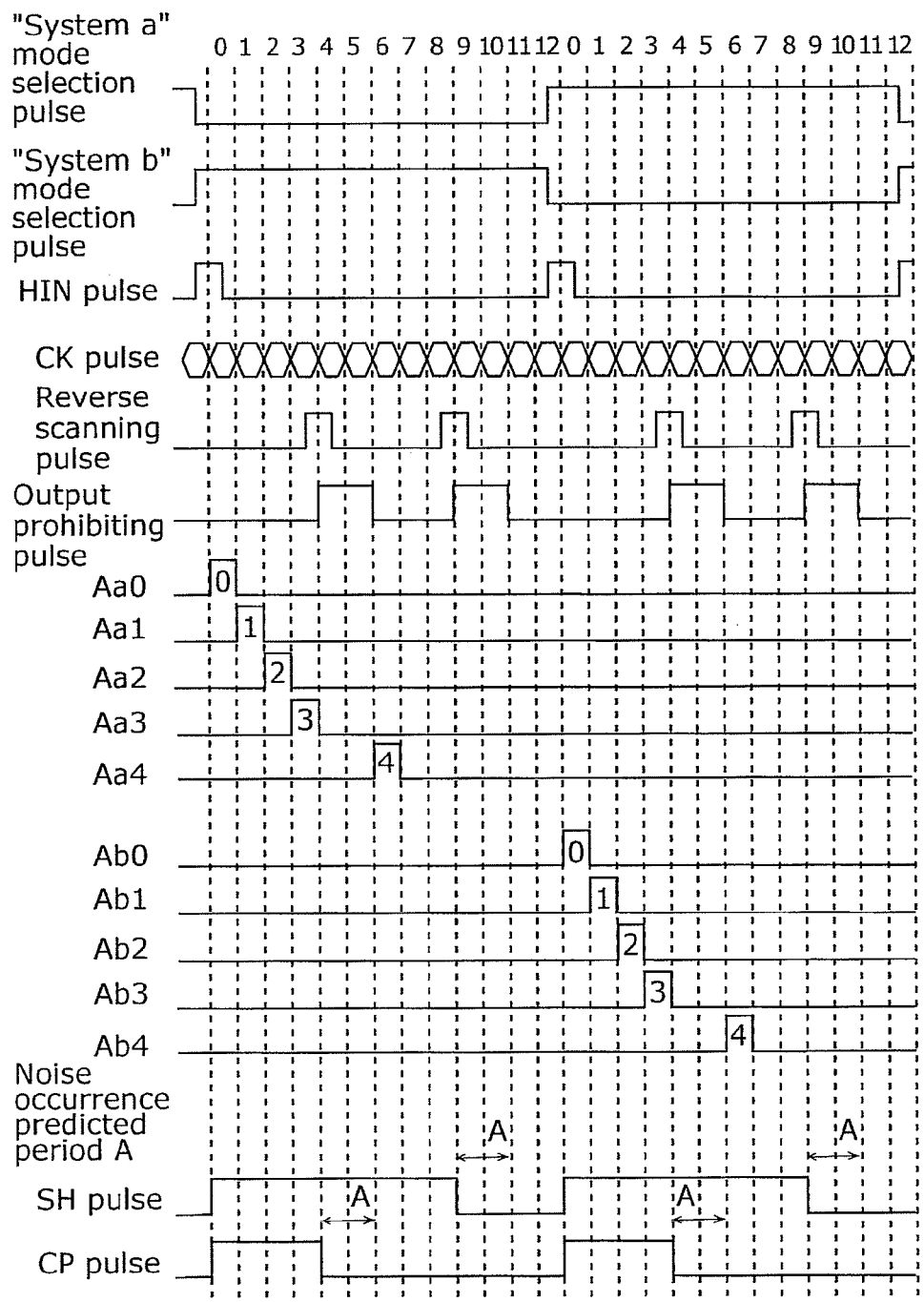
FIG. 18 shows an operation of the column selecting decoder according to Embodiment 3 in the present invention.

FIG. 18 shows an operation of the column selecting decoder 14 according to Embodiment 3 in the present invention.

As FIG. 18 shows, the column selecting decoder 14 shifts the shift register (i) in the forward direction when a reverse scanning pulse is at the low level, and (ii) in the backward direction when the reverse scanning pulse is in the high level. When the output prohibiting pulse is at the high level, the column selecting decoder 14 cancels transmitting, to a signal processing unit, a selecting signal provided from the shift register. This operation makes possible reading, during the noise occurrence predicted period, fewer pixel signals which do not form an image and thus are unnecessary.

Embodiment 4

Embodiment 4 differs from Embodiment 2 in that Embodiment 4 prohibits reading of the pixel signals during the noise occurrence predicted period. Other than the prohibition, Embodiment 4 is similar to Embodiment 2; therefore, the details of Embodiment 4 shall be omitted.

Figure 19:
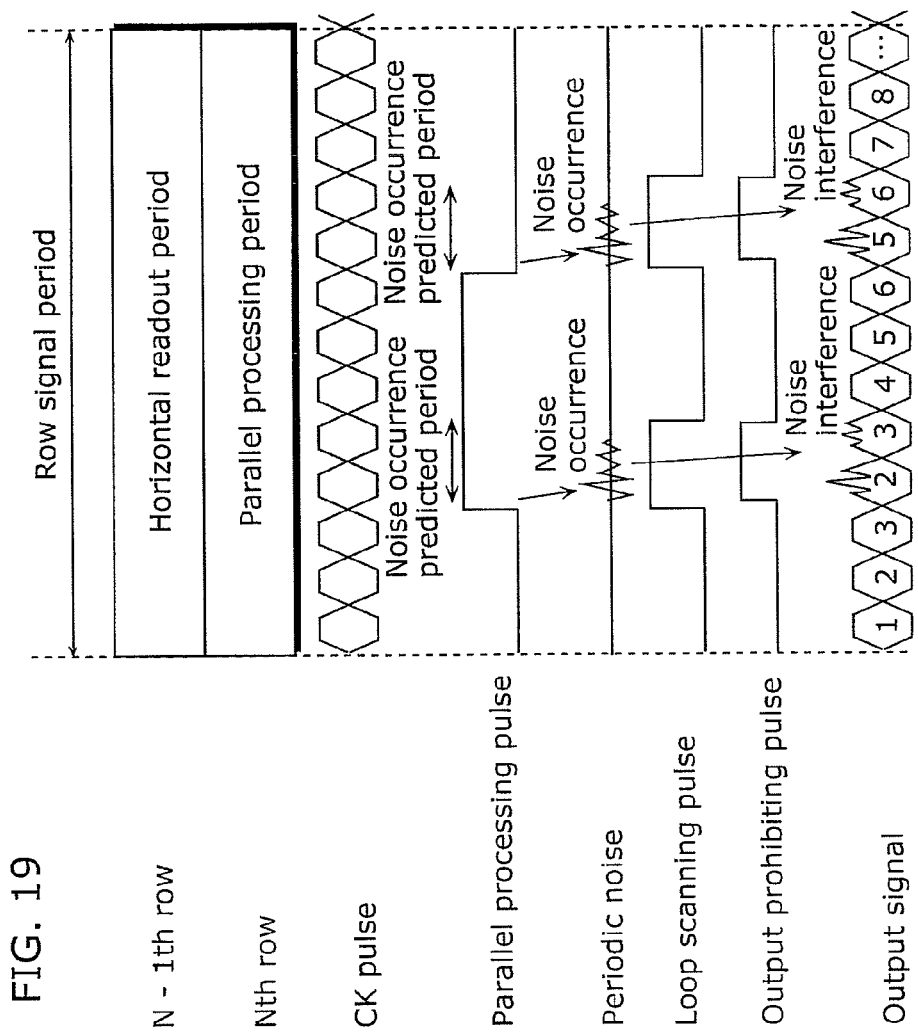
FIG. 19 shows an operation for postponing reading of pixel signals in column order according to Embodiment 3 in the present invention.

FIG. 19 shows an operation for postponing reading of the pixel signals in column order according to Embodiment 4 in the present invention.

In Embodiment 4, the column selecting decoder 14 (i) reads the pixel signals when an output prohibiting pulse is at the low level, and (ii) suspends reading the pixel signals when the output prohibiting pulse is at the high level. In principle, the output prohibiting pulse is designed to be brought to the low level during the horizontal readout period. The output prohibiting pulse is exceptionally designed to be brought to the high level during the noise occurrence predicted period. Designing the output prohibiting pulse as described above can postpone the reading of the pixel signals in column order during the noise occurrence predicted period, and makes possible reading fewer pixel signals which do not form an image and thus are unnecessary. The column selecting decoder 14 does not read the unnecessary pixel signals during the noise occurrence predicted period, which contributes to the reduction of power consumption of a circuit for reading the pixel signals and an image processing system.

Figure 20:
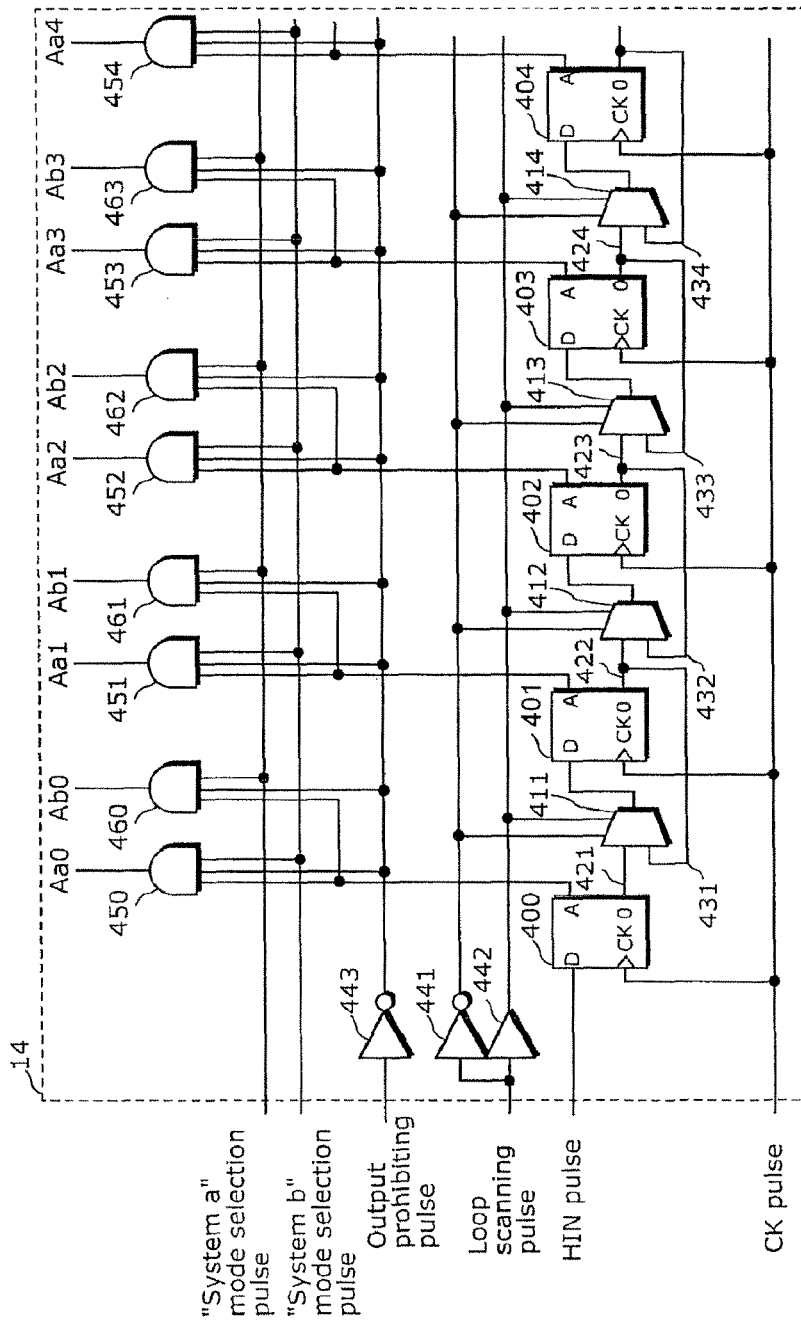
FIG. 20 shows a structure of a column selecting decoder according to Embodiment 3 in the present invention.

FIG. 20 shows a structure of the column selecting decoder 14 according to Embodiment 4 in the present invention.

The circuits in the column selecting decoder 14 are the same in structure for each column.

Focus on one column (for example, a first column). Embodiment 4 differs from Embodiment 2 in that AND circuits 451 and 461 receive an inversion signal of the output prohibiting pulse. In other words, the AND circuit 451 generates the logical AND Aa1 of (i) an output A1 from a flip-flop 401, (ii) a "system b" mode selection pulse, and (iii) the inversion signal of the output prohibiting pulse. The AND circuit 461 generates the logical AND Ab1 of (i) the output A1 from the flip-flop 401, (ii) a "system a" mode selection pulse, and (iii) the inversion signal of the output prohibiting pulse. Other than the above structure, Embodiment 4 is similar to Embodiment 2.

Figure 21:
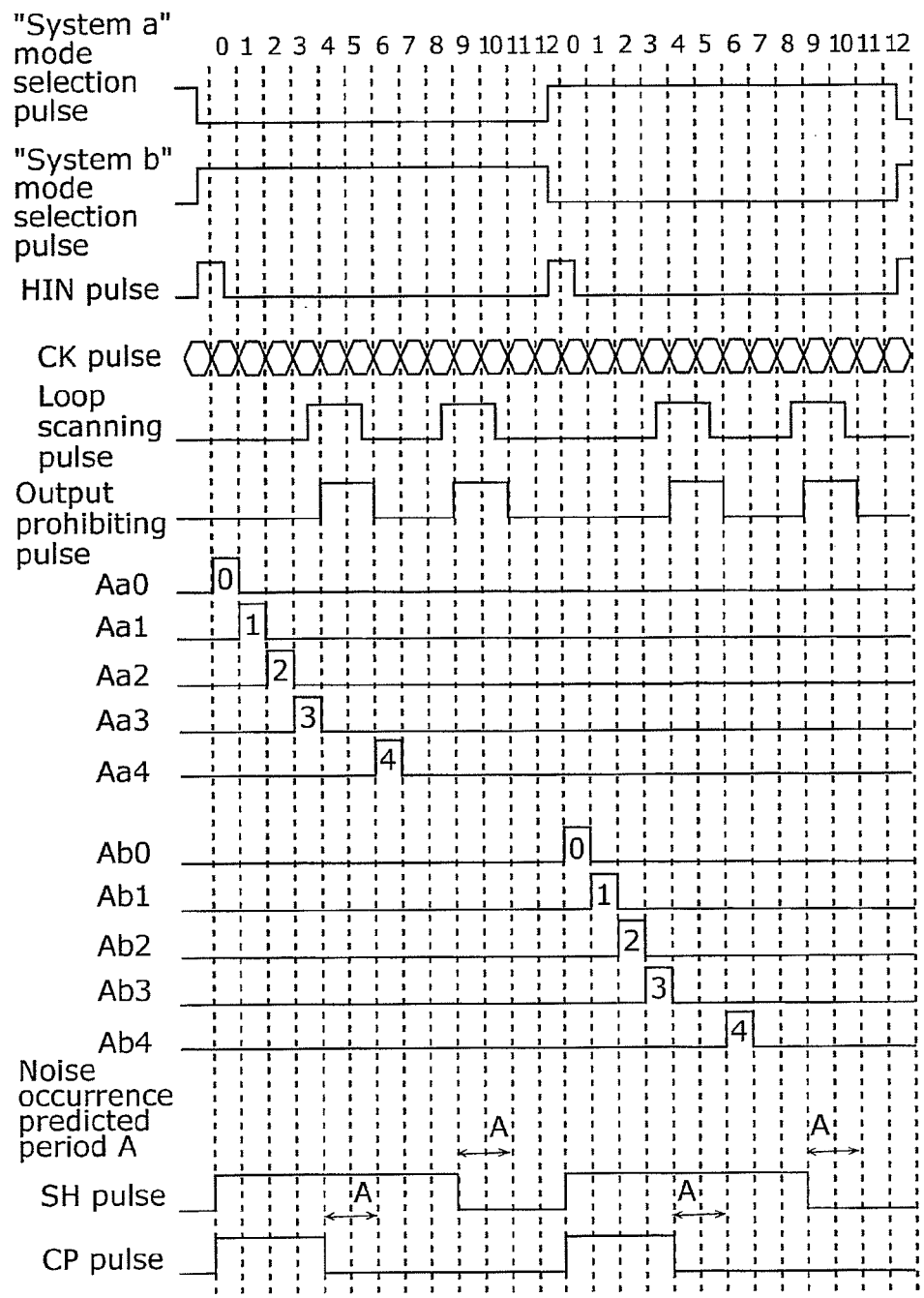
FIG. 21 shows an operation of a column selecting decoder according to Embodiment 4 in the present invention.

FIG. 21 shows an operation of the column selecting decoder 14 according to Embodiment 4 in the present invention.

As shown in FIG. 21, the column selecting decoder 14 (i) shifts a shift register when a loop scanning pulse is at the low level, and (ii) suspends shifting the shift register when the loop scanning pulse is at the high level. When the output prohibiting pulse is at the high level, the column selecting decoder 14 does not transmit, to a signal processing unit, a selecting signal provided from the shift register. This operation makes possible reading, during the noise occurrence predicted period, fewer pixel signals which do not form an image and thus are unnecessary.

Figure 22:
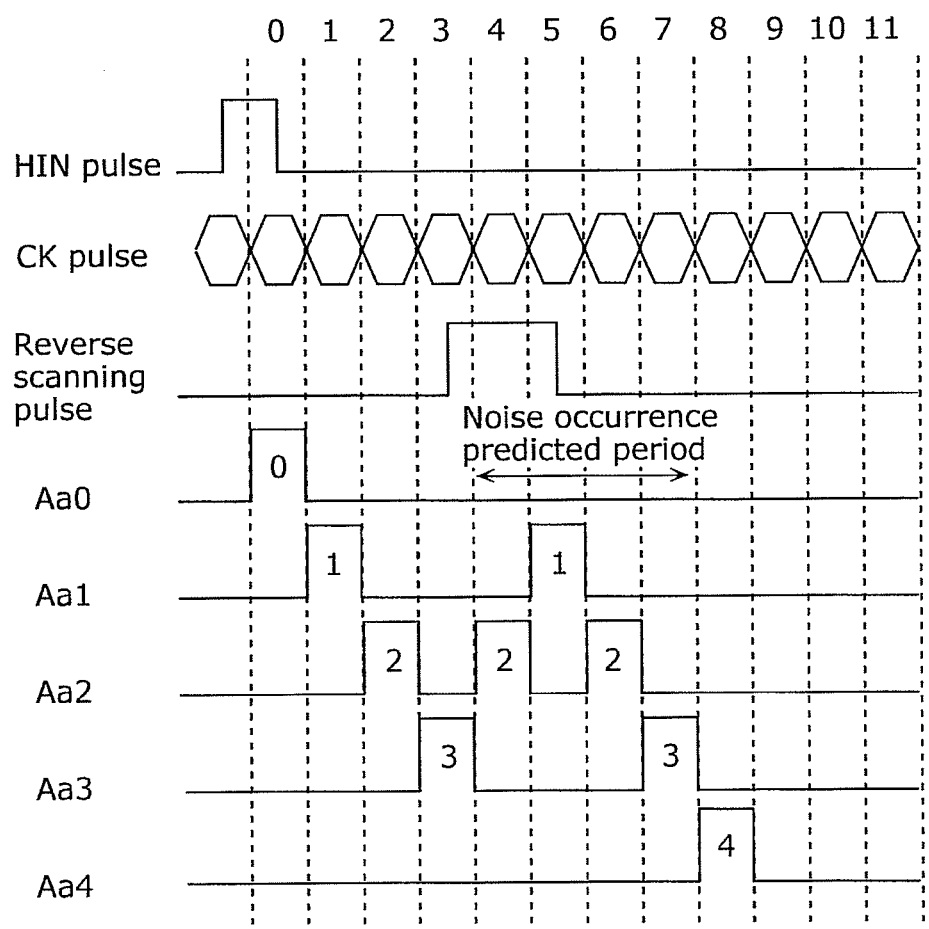
FIG. 22 shows an operation of the row selecting decoder when the length of a period, which switches a reverse scanning pulse to the high level, changes in Embodiment 1.
Figure 23:
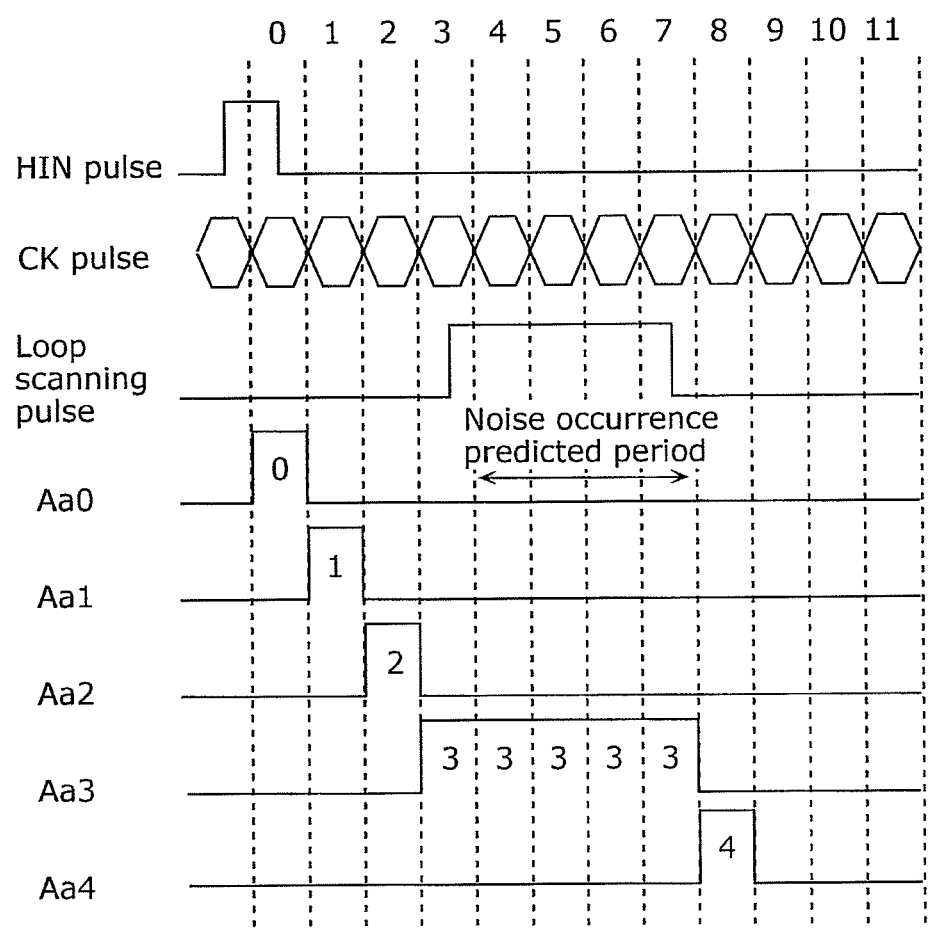
FIG. 23 shows an operation of the row selecting decoder when the length of a period, which switches a loop scanning pulse to the high level, changes in Embodiment 2.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention. (i) In Embodiments, the noise occurrence predicted period lasts for two pixel periods; however, the present invention shall not be limited to this. The noise occurrence predicted period varies depending on various kinds of parameters, such as the cause of noise and a circuit structure. Thus, the high level period for the reverse scanning pulse and the loop scanning pulse may be accordingly set depending on the noise occurrence predicted period (see FIGS. 22 and 23, for example).

Figure 24:
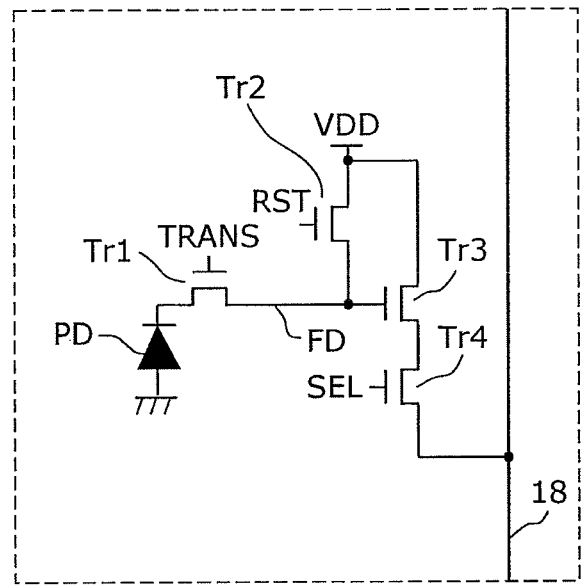
FIG. 24 shows another example of the pixel structure.
Figure 25:
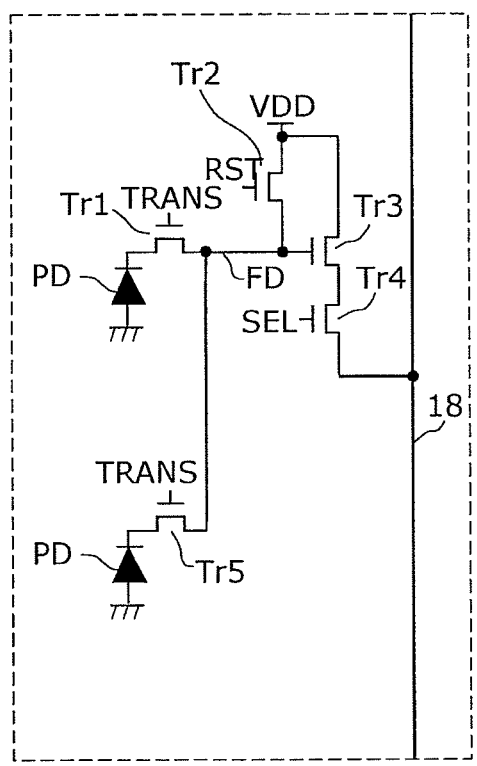
FIG. 25 shows another example of the pixel structure.

(ii) In Embodiments, the pixel structures are specifically described; however, the present invention shall not be limited to the description. For example, the pixel may include four transistors as shown in FIG. 24. In the pixel, one floating diffusion FD may be shared with two photodiodes PD as shown in FIG. 25. With the structure shown in FIG. 24, a transistor Tr4 selects a line (selecting a row), eliminating the need for modulating a power source VDD. This structure makes possible driving the solid-state imaging device more simply. In addition, the structure in FIG. 25 can reduce deterioration of image quality even though pixel signals increase in number, following an increase in the number of the photodiodes PD.

Figure 26:
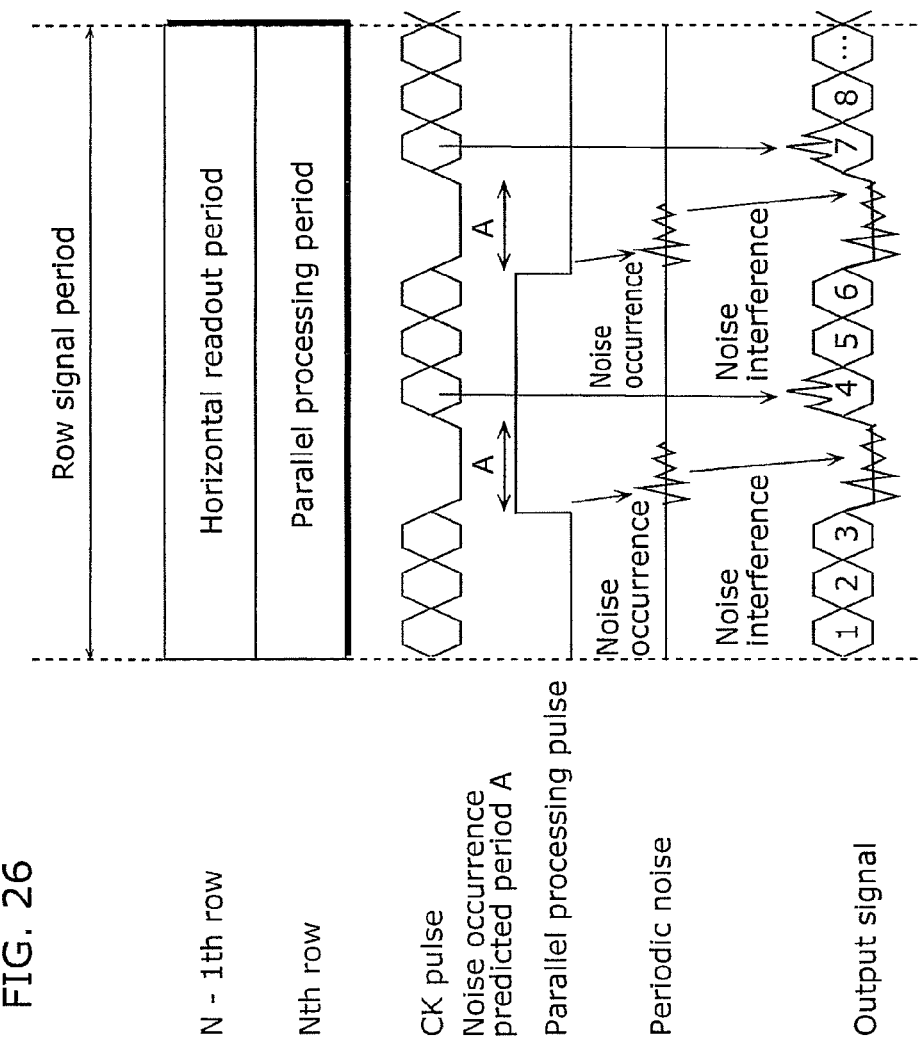
FIG. 26 shows another example of the operation for postponing reading of pixel signals in column order.
Figure 27:
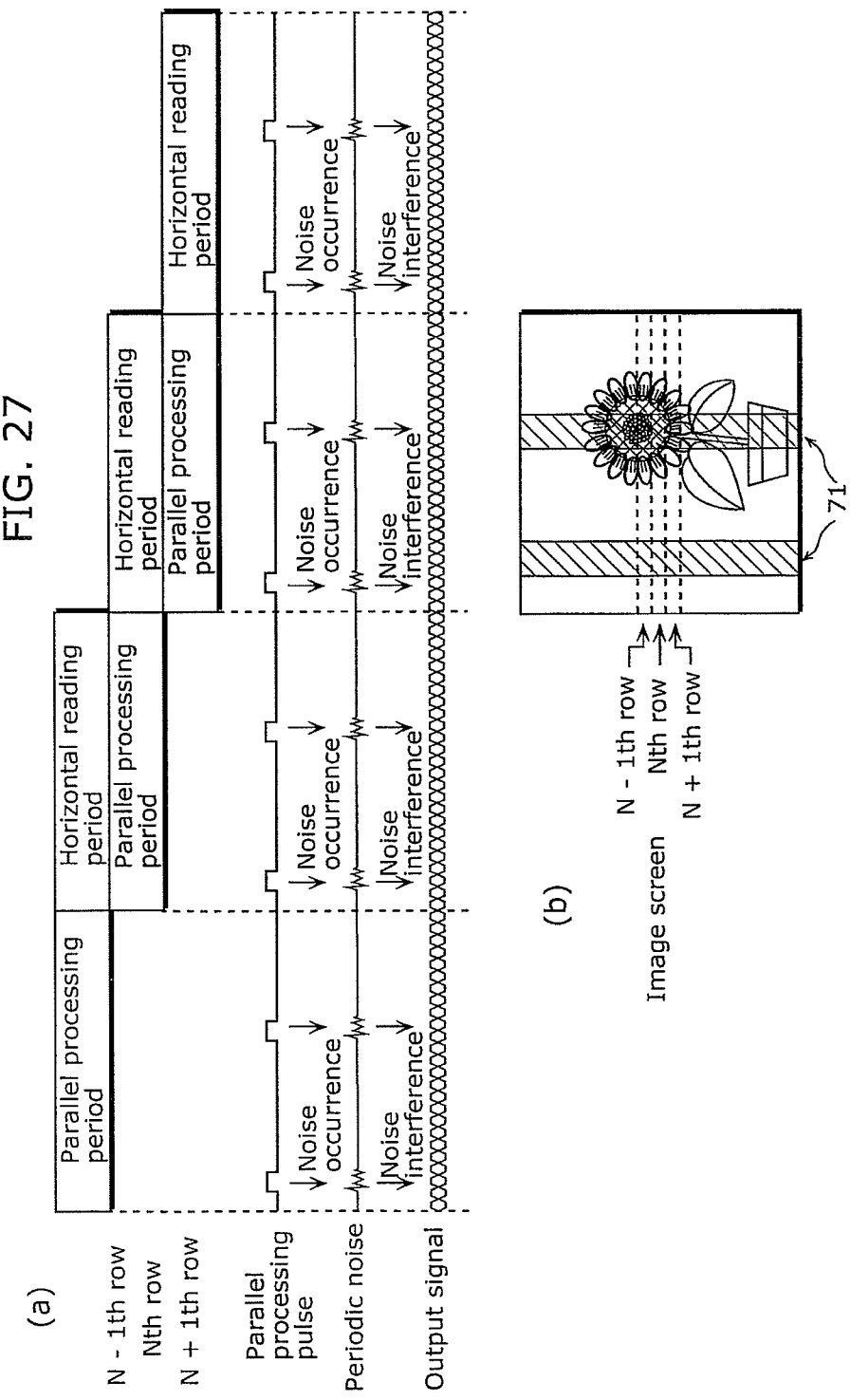
FIG. 27 shows image noise and a cause thereof.

(iii) In Embodiment 3, the reading of pixel signals in column order is postponed during the noise occurrence predicted period with the shift register kept driving; however, the present invention shall not be limited to this operation. For example, the shift register may suspend driving during the noise occurrence predicted period, and resume driving after a lapse of the noise occurrence predicted period. When the shift register suspends and resumes driving as shown in FIG. 26; however, the variation in power supply and voltage due to a sudden load change could end up developing noise immediately after the resume. In the case where the above problem is expected, the reading of the pixel signals in column order with the shift register kept driving is preferably postponed.

As described above in Embodiments 1 to 4, the present invention involves the following operations during the horizontal readout period except the noise occurrence predicted period; reading of the pixel signals from the pixels included in the first row, and, in parallel, holding the pixel signals in the pixels included in the second row. Hence, compared with the case where the operations are executed not in parallel, executing the operations in parallel contributes to the reduction of the reading time of the pixel signals. Furthermore, the pixel signals are not read in column order during the noise occurrence predicted period. Even though there would be some read pixel signals, the read signals will be discarded. This contributes to the reduction in noise interference in the pixel signals forming an image. As a result, image fixed pattern vertical line noise or a vertical strip is reduced.

The reading control unit may cause a shift register, which can shift in a forward direction and in a backward direction, to shift in the forward direction, and to read, in the column order, a pixel signal in a pixel in the first row. The reading suspending unit may cause the shift register to shift in the backward direction during a half of the noise occurrence predicted period and in the forward direction during the rest of the half of the noise occurrence predicted period, so that the shift register postpones the reading, in the column order, of one and succeeding pixel signals in pixels in the first row during the noise occurrence predicted period.

The reading control unit may cause the shift register, which can suspend shifting while receiving a clock pulse, to execute shifting, and to read, in the column order, a pixel signal in a pixel in the first row. The reading suspending unit may cause, during the noise occurrence predicted period, the register to suspend the shifting while the shift register is receiving the clock pulse, so that the shift register postpones the reading of one and succeeding pixel signals in pixels in the first row.

These operations make possible postponing the reading of the pixel signals in column order with the shift register kept driving. The reading of the pixel signals can be postponed with the clock pulse canceled and the shift register itself shut down. When the shift register is shut down, however, the variation in power supply and voltage due to a sudden load change in resuming the shift register could end up developing noise immediately after the resumption. The above operations make possible postponing the reading of only the pixel signals in column order with the shift register kept driving, which prevents the above problem. Accordingly, image noise is effectively reduced.

In addition, the read signals may be replaced with another signal potential immediately before resumption of their reading. This contributes to reduction in a vertical line found due to an unstable reset potential immediately after the resumption of the reading. In particular, when (i) the pixel signals are immediately held before the postponement of their reading temporarily held, and (ii) the held pixel signals are replaced with the read signals immediately before the resumption of their reading, the initial electric potential in resetting the horizontal common signal readout line immediately after the resumption of the reading is approximately the same as that observed when there is no postponement of the reading. This contributes to the reduction of small noise due to frequency-response characteristics in the resetting.

The reading control unit may cause the shift register to provide a selecting signal from the shift register to the first line memory, and to read, in the column order, one and succeeding pixel signals in a pixel in the first row. The solid-state imaging device may further include a reading prohibiting unit which prohibits transmitting, during the noise occurrence predicted period, the column selecting signal provided from the shift register.

During the noise occurrence period, the above structure prevents the reading of the pixel signals which do not form an image. This contributes to the reduction of the power consumption of a circuit for reading the pixel signals and of an image processing system.

INDUSTRIAL APPLICABILITY

The present invention is suitable to solid-state imaging devices and cameras and, in particular, to an image sensor, an all-in-one video camera, a digital still camera, a camera cellular phone, a monitoring camera, a camera built in a laptop computer, and a camera unit connected to an information processing device.

What is claimed is:

1. A solid-state imaging device comprising:
an image area including pixels arranged in a matrix;
two row memories each of which alternatively (i) stores at a time pixel signals provided from said image area for each of rows, and (ii) sequentially provides each of the stored pixel signals;
a reading control unit configured to, during a horizontal readout period, sequentially read the stored pixel signals one by one from a first line memory to cause said first line memory, said first line memory representing one of said two row memories;
a holding control unit configured to cause, during the horizontal readout period, a second line memory to hold pixel signals provided from one of the rows in said image area, said second line memory representing another one of said two row memories; and
a reading suspending unit configured to cause said reading control unit to suspend reading out the pixel signals from said first line memory during a noise occurrence predicted period which (i) is included in the horizontal readout period, and (ii) sees occurrence of noise predicted due to an operation of said holding control unit,
wherein said reading control unit is configured to cause said first line memory to provide, to the horizontal common signal readout line, each of the pixel signals read from said first line memory, and
said solid-state imaging device further comprises a replacing unit configured to replace (i) an electric potential of the horizontal common signal readout line immediately before the noise occurrence predicted period ends with (ii) an electric potential of the stored pixel signal provided immediately before the noise occurrence predicted period starts.

2. A solid-state imaging device comprising:
an image area including pixels arranged in a matrix;
two row memories each of which alternatively (i) stores at a time pixel signals provided from said image area for each of rows and (ii) sequentially provides each of the stored pixel signals;
a reading control unit configured to, during a horizontal readout period, sequentially read the stored pixel signals one by one from a first line memory to cause said first line memory, said first line memory representing one of said two row memories;
a holding control unit configured to cause, during the horizontal readout period, a second line memory to hold pixel signals provided from one of the rows in said image area, said second line memory representing another one of said two row memories; and
a reading suspending unit configured unit to suspend reading out the pixel signals from said first line memory during a noise occurrence predicted period which (i) is included in the horizontal readout period, and (ii) sees occurrence of noise predicted due to an operation of said holding control unit,
wherein said reading control unit includes a shift register which (i) can substantially suspend shifting while receiving a clock pulse, and (ii) provides, to said first line memory, a column selecting signal corresponding a reading position of the pixel signals stored in said first line memory, and
said reading suspending unit is configured to cause, during the noise occurrence predicted period, said shift register to substantially suspend the shifting while said shift register is receiving the clock pulse, so that said shift register postpones the reading of one and succeeding pixel signals out of the pixel signals during the noise occurrence predicted period.

3. The solid-state imaging device according to claim 2, wherein said shift register (i) can switch shifting between a forward direction and a backward direction, and (ii) provides, to said first line memory, the column selecting signal corresponding to the reading position of the pixel signals stored in said first line memory, and
said reading suspending unit is configured to cause said shift register to shift in the backward direction during a first half of the noise occurrence predicted period and in the forward direction during a last half of the noise occurrence predicted period, so that said shift register postpones the reading of one and succeeding pixel signals out of the pixel signals during the noise occurrence predicted period.

4. The solid-state imaging device according to claim 2, wherein said shift register (i) includes unit registers of stages,
and (ii) can selectively provide an output signal of each of the unit registers to either the each unit register or the unit register positioned in a subsequent stage of the each unit register, the stage being included in the stages, and
said reading suspending unit is configured to cause each unit register to provide the output signal to the unit register during the noise occurrence predicted period.

5. The solid-state imaging device according to claim 2, further comprising a reading prohibiting unit configured to prohibit transmitting, during the noise occurrence predicted period, the column selecting signal provided from said shift register.

6. The solid-state imaging device according to claim 1, wherein said reading control unit includes a shift register which (i) can substantially suspend shifting while receiving a clock pulse, and (ii) provides, to said first line memory, a column selecting signal corresponding a reading position of the pixel signals stored in said first line memory, and
said reading suspending unit is configured to cause, during the noise occurrence predicted period, said shift register to substantially suspend the shifting while said shift register is receiving the clock pulse, so that said shift register postpones the reading of one and succeeding pixel signals out of the pixel signals during the noise occurrence predicted period.

7. The solid-state imaging device according to claim 6, wherein said shift register (i) can switch shifting between a forward direction and a backward direction, and (ii) provides, to said first line memory, the column selecting signal corresponding to the reading position of the pixel signals stored in said first line memory, and
said reading suspending unit is configured to cause said shift register to shift in the backward direction during a first half of the noise occurrence predicted period and in the forward direction during a last half of the noise occurrence predicted period, so that said shift register postpones the reading of one and succeeding pixel signals out of the pixel signals during the noise occurrence predicted period.

8. The solid-state imaging device according to claim 6, wherein said shift register (i) includes unit registers of stages, and (ii) can selectively provide an output signal of each of the unit registers to either the each unit register or the unit register positioned in a subsequent stage of the each unit register, the stage being included in the stages, and said reading suspending unit is configured to cause each unit register to provide the output signal to the unit register during the noise occurrence predicted period.

9. The solid-state imaging device according to claim 6, further comprising a reading prohibiting unit configured to prohibit transmitting, during the noise occurrence predicted period, the column selecting signal provided from said shift register.

10. An imaging apparatus comprising:

an image area including pixels arranged in a matrix;

two row memories each of which alternatively (i) stores at a time pixel signals provided from said image area for each of rows, and (ii) sequentially provides each of the stored pixel signals;

a reading control unit configured to, during a horizontal readout period, (i) sequentially read the stored pixel signals one by one from a first line memory to cause said first line memory, said first line memory representing one of said two row memories;

a holding control unit configured to cause, during the horizontal readout period, a second line memory to hold pixel signals provided from one of the rows in said image area, said second line memory representing another one of said two row memories;

a reading suspending unit configured to cause said reading control unit to suspend reading out the pixel signals from said first line memory during a noise occurrence predicted period which (i) is included in the horizontal readout period, and (ii) sees occurrence of noise predicted due to an operation of said holding control unit; and a discarding unit configured to discard, from among the pixel signals read by said reading control unit, the pixel signals read during the noise occurrence predicted period.

* * * * *